United States Patent
Lee et al.

(10) Patent No.: US 10,056,946 B2
(45) Date of Patent: Aug. 21, 2018

(54) WIRELESS POWER TRANSMITTING DEVICE AND METHOD FOR CONTROLLING THE SAME

(71) Applicant: SAMSUNG ELECTRONICS CO., LTD., Suwon-si (KR)

(72) Inventors: Kyung-Woo Lee, Seoul (KR); Jae-Hyuck Shin, Suwon-si (KR); Sang-Wook Lee, Suwon-si (KR); Chong-Min Lee, Seoul (KR); Hyo-Seok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/474,506

(22) Filed: Mar. 30, 2017

(65) Prior Publication Data
US 2017/0288738 A1  Oct. 5, 2017

Related U.S. Application Data

(60) Provisional application No. 62/315,869, filed on Mar. 31, 2016.

(30) Foreign Application Priority Data

Aug. 2, 2016 (KR) .......................... 10-2016-0098432

(51) Int. Cl.
*H04B 5/00* (2006.01)
*H04B 7/04* (2017.01)
(Continued)

(52) U.S. Cl.
CPC ......... *H04B 5/0037* (2013.01); *H04B 17/101* (2015.01); *H04W 4/026* (2013.01);
(Continued)

(58) Field of Classification Search
CPC ...... H04B 5/0037; H04B 7/04; H04B 7/0897; H04B 17/27; H04B 7/043; H04B 7/0617;
(Continued)

(56) References Cited

U.S. PATENT DOCUMENTS 7,483,336 B2   1/2009  Carof
9,312,924 B2*  4/2016  Ozaki ..................... H02J 7/025
(Continued)

FOREIGN PATENT DOCUMENTS

KR   10-2008-0098035 A   11/2008
KR   10-2013-0128041 A   11/2013
(Continued)

OTHER PUBLICATIONS

International Search Report and Written Opinion issued in counterpart International Patent Application No. PCT/KR2017/003503 dated Jun. 20, 2017 (9 pages in Korean).

Primary Examiner — Andrew Wendell
(74) Attorney, Agent, or Firm — NSIP Law

(57) ABSTRACT

According to an embodiment a wireless power transmitting device, includes a power transmission antenna including patch antennas to wirelessly transmit power, and communication antennas configured to receive a communication signal from an electronic device. The wireless power transmitting device also includes a processor configured to detect a direction in which the electronic device is positioned based on the communication signal received through the communication antennas and control the power transmission antenna to transmit the power in the detected direction.

18 Claims, 18 Drawing Sheets

(51) Int. Cl.
*H04W 4/02* (2018.01)
*H04W 52/52* (2009.01)
*H04W 52/28* (2009.01)
*H04W 52/42* (2009.01)
*H04B 17/10* (2015.01)
*H04W 4/70* (2018.01)

(52) U.S. Cl.
CPC ......... *H04W 52/283* (2013.01); *H04W 52/42* (2013.01); *H04W 52/52* (2013.01); *H04B 7/04* (2013.01); *H04B 17/102* (2015.01); *H04W 4/70* (2018.02)

(58) Field of Classification Search
CPC ..... H04B 7/0695; H04B 7/088; H04W 52/52; H04W 16/28; H04W 4/026; H04W 4/005
See application file for complete search history.

(56) References Cited

U.S. PATENT DOCUMENTS

| | | | |
|---|---|---|---|
| 2006/0007890 A1* | 1/2006 | Yokoyama | H04B 7/086 370/334 |
| 2007/0178945 A1 | 8/2007 | Cook et al. | |
| 2011/0087306 A1* | 4/2011 | Goossen | A61N 1/3718 607/60 |
| 2011/0250928 A1* | 10/2011 | Schlub | H01Q 1/243 455/550.1 |
| 2013/0099975 A1* | 4/2013 | Cyganski | G01S 5/0205 342/432 |
| 2015/0067580 A1* | 3/2015 | Um | G06F 3/017 715/781 |
| 2015/0188365 A1* | 7/2015 | Wang | H01Q 7/00 307/104 |
| 2015/0340911 A1 | 11/2015 | Bell et al. | |
| 2015/0349574 A1 | 12/2015 | Leabman | |
| 2016/0192209 A1* | 6/2016 | Rumreich | H04W 16/28 455/562.1 |
| 2017/0077765 A1* | 3/2017 | Bell | H02J 50/60 |
| 2017/0219700 A1* | 8/2017 | Hewett | G01S 7/526 |

FOREIGN PATENT DOCUMENTS

| | | |
|---|---|---|
| KR | 10-2014-0123222 A | 10/2014 |
| WO | WO 2014-075103 A1 | 5/2014 |
| WO | WO 2015-022690 A1 | 2/2015 |

\* cited by examiner

WIRELESS POWER TRANSMITTING DEVICE AND METHOD FOR CONTROLLING THE SAME

CROSS-REFERENCE TO RELATED APPLICATIONS

This application claims the benefit under 35 U.S.C. § 119(a) of a US patent application filed in the United States Patent and Trademark Office on Mar. 31, 2016 and assigned Ser. No. 62/315,869, and a Korean patent application filed in the Korean Intellectual Property Office on Aug. 2, 2016 and assigned Serial No. 10-2016-0098432, the entire disclosure of which is incorporated herein by reference.

BACKGROUND

1. Field

The following description relates to wireless power transmitting devices and methods for controlling the same, and more specifically, to wireless power transmitting devices configured to wirelessly transmit power to electronic devices and methods for controlling the same.

2. Description of Related Art

Portable digital communication devices have become indispensable to people. Customers desire to receive various high-quality services anytime, anywhere, and at a fast speed. Recent development of Internet of Things (IoT) technology bundles various sensors, home appliances, and communication devices into a single network. A diversity of sensors require a wireless power transmission system for seamless operations.

Wireless power transmission is produced using magnetic induction type, magnetic resonance type, or electromagnetic wave type, to remotely transmit power.

Such electromagnetic wave type remotely transmits power. Thus, it is important to determine, within a great degree of accuracy a location of the receivers at remote locations to effectively and efficiently deliver power to these receivers.

In order to determine the position or location of a target for charging, for instance, an electronic device, a conventional electromagnetic wave scheme forms radio frequency (RF) waves in multiple directions, receives information about power reception from the electronic device, and uses the received information to make such determination of the position or the location of the electronic device. However, the formation of RF waves in multiple directions and the reception of power-related information take a large amount of time and power. In particular, high-power transmission before sensing a target for charging is not likely to be done due to harm to humans.

The above information is presented as background information only to assist with an understanding of the present disclosure. No determination has been made, and no assertion is made, as to whether any of the above might be applicable as prior art with regard to the present application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to various embodiments, a wireless power transmitting device is described that determines a direction of wireless power transmission using communication signals from an electronic device and determines a precise location of the electronic device using the determined direction. A corresponding method is also described.

In accordance with an embodiment, there is provided a wireless power transmitting device, including: a power transmission antenna comprising patch antennas; communication antennas; and a processor configured to receive, through the communication antennas, a communication signal from an electronic device, detect a direction in which the electronic device is positioned based on the communication signal received through the communication antennas and control to transmit the power, through the power transmission antenna, in the detected direction.

The processor may determine the direction in which the electronic device is positioned based on at least one of a difference in time of reception of the communication signal at each of the communication antennas and a difference in phase of the communication signal received by each of the communication antennas.

The processor may control the patch antennas so that sub-radio frequency (RF) waves of a first magnitude constructively interfere with each other in the direction of the electronic device.

The processor may determine whether or not to adjust a magnitude of the sub-RF waves of the first magnitude based on whether received power-related information in a second communication signal received after the reception of the communication signal meets a preset condition.

The processor may control the patch antennas so that the sub-RF waves of a second magnitude constructively interfere with each other in response to the received power-related information failing to meet the preset condition, and wherein the processor may determine whether or not to adjust the magnitude of the sub-RF waves of the second magnitude based on whether RX power-related information in a third communication signal received from the electronic device meets the preset condition.

The wireless power transmitting device may further include: a power source configured to supply the power; and a power amplifier configured to amplify the power, wherein the processor changes the magnitude of the sub-RF waves from the first magnitude to the second magnitude by changing an amplification gain of the power amplifier.

The processor may adjust the power provided to the patch antennas until the received power-related information meets the preset condition, and wherein the processor maintains the magnitude of the power supplied to the patch antennas in response to the received power-related information meeting the preset condition.

The processor may adjust the power provided to the patch antennas to a magnitude of the power to which the power is previously adjusted for the patch antennas in response to the received power-related information failing to meet a first condition and may adjust the power provided to the patch antennas to a half of the magnitude of the power to which the power is previously adjusted for the patch antennas in response to the received power-related information meeting the preset first condition and failing to meet a preset second condition.

The processor may adjust a phase of the power inputted to each of the patch antennas so that the sub-RF waves of the first magnitude constructively interfere with each other in the detected direction.

The wireless power transmitting device may further include: phase shifters, each shifting the phase of the power inputted to each of the patch antennas, wherein the processor may adjust the phase of the power inputted to each of the patch antennas by controlling each of the phase shifters.

The processor may adjust a magnitude of the power inputted to each of the patch antennas so that the sub-RF waves of the first magnitude constructively interfere with each other in the detected direction.

The communication signal may include at least one of identification information of the electronic device and rated power information about the electronic device, and wherein the processor may determine whether to charge the electronic device based on at least one of the identification information of the electronic device and the rated power information about the electronic device.

The processor may determine to charge the electronic device, may detect a movement of the electronic device while charging the electronic device with the sub-RF waves of the first magnitude, changes at least one of a magnitude of the sub-RF waves and the determined direction based on the movement of the electronic device, and charges the electronic device.

The processor may detect the movement of the electronic device using movement information about the electronic device in a second communication signal received from the communication antennas, may detect the movement of the electronic device based on a time of reception of a third communication signal by each of the communication antennas, or may detect the movement of the electronic device corresponding to a failure to meet a preset condition of RX power-related information in a fourth communication signal received after the reception of the third communication signal from the communication antennas.

Each of the communication antennas may receive other communication signal from another electronic device, and wherein the processor may determine a direction in which the other electronic device is positioned based on at least one of a difference in time of reception and a difference in phase of the other communication signal by each of the communication antennas from the other electronic device.

The processor may divide the patch antennas into a first patch antenna group to charge the electronic device and a second patch antenna group to charge the other electronic device based on any one or any combination of any two or more of a direction in which the electronic device is positioned, a direction in which the other electronic device is positioned, rated power information about the electronic device, and rated power information about the other electronic device, and wherein the processor may perform control so that the first patch antenna group charges the electronic device, and the second patch antenna group charges the other electronic device.

The processor may perform control so that the patch antennas charge the electronic device during a first period and the patch antennas charge the other electronic device during a second period.

In accordance with an embodiment, there is provided a method to control a wireless power transmitting device, including: receiving a communication signal from an electronic device; detecting a direction in which the electronic device is positioned based on the communication signal; and transmitting power wirelessly in the detected direction.

Detecting the direction of the electronic device based on the communication signal may include determining the direction of the electronic device based on at least one of a difference in time of reception of the communication signal and a difference in phase of the communication signal received by each of communication antennas in the wireless power transmitting device.

Transmitting the power in the detected direction may include controlling patch antennas in the wireless power transmitting device so that sub-radio frequency (RF) waves of a first magnitude constructively interfere with each other in the direction of the electronic device.

The method may further include: determining whether to charge the electronic device with the sub-RF waves of the first magnitude depending on whether received (RX) power-related information in a second communication signal received after the reception of the communication signal meets a preset condition.

The method may further include: controlling the patch antennas so that the sub-RF waves of a second magnitude constructively interfere with each other in response to the received power-related information being determined to fail to meet the preset condition; and determining whether to charge the electronic device with the sub-RF waves of the second magnitude depending on whether RX power-related information in a third communication signal received from the electronic device meets the preset condition.

Controlling the patch antennas so that the sub-radio frequency (RF) waves of the second magnitude constructively interfere with each other in the determined direction may include changing a magnitude of the sub-RF waves from the first magnitude to the second magnitude by varying an amplification gain of the power amplifier.

The method may further include: adjusting the power provided to the patch antennas until the received power-related information meets the preset condition; and charging the electronic device with the power provided to the patch antennas in response to the received power-related information meeting the preset condition.

The method may further include: adjusting the power provided to the patch antennas to a magnitude of the power to which the power is previously adjusted for the patch antennas in response to the received power-related information failing to meet a first condition; and adjusting the power provided to the patch antennas to a half of the magnitude of the power to which the power is previously adjusted for the patch antennas in response to the received power-related information meeting the preset first condition and failing to meet a preset second condition.

Transmitting the power in the detected direction may include adjusting a phase of the power inputted to each of the patch antennas so that the sub-RF waves of the first magnitude constructively interfere with each other in the detected direction.

Adjusting the phase of the power inputted to each of the patch antennas may include adjusting the phase of the power inputted to each of the patch antennas by controlling each of phase shifters.

Transmitting the power in the detected direction may include adjusting a magnitude of the power inputted to each of the patch antennas so that the sub-RF waves of the first magnitude constructively interfere with each other in the detected direction.

The communication signal may include at least one of identification information about the electronic device and rated power information about the electronic device, and wherein the method further may include determining whether to charge the electronic device based on at least one of the identification information about the electronic device and the rated power information about the electronic device.

The method may further include: determining to charge the electronic device, may detect a movement of the electronic device while charging the electronic device with the sub-RF waves of the first magnitude; and varying at least one of a magnitude of the sub-RF waves and the determined direction corresponding to the movement of the electronic device, and charges the electronic device.

Detecting the movement of the electronic device may include detecting the movement of the electronic device using movement information about the electronic device in a second communication signal received from communication antennas in the wireless power transmitting device, detecting the movement of the electronic device based on a time of reception of a third communication signal by each of the communication antennas, or detecting the movement of the electronic device corresponding to a failure to meet a preset condition of received (RX) power-related information in a fourth communication signal received after the reception of the third communication signal from the communication antennas.

The method may further include: receiving another communication signal from another electronic device; and determining a direction in which the other electronic device is positioned based on at least one of a difference in time of reception and a difference in phase of the other communication signal by each of communication antennas in the wireless power transmitting device from the other electronic device.

The method may further include: dividing the patch antennas into a first patch antenna group for charging the electronic device and a second patch antenna group for charging the other electronic device based on any one or any combination of any two or more of a direction in which the electronic device is positioned, a direction in which the other electronic device is positioned, rated power information about the electronic device, and rated power information about the other electronic device; and enabling the first patch antenna group to charge the electronic device and the second patch antenna group to charge the other electronic device.

The method may further include: enabling the patch antennas to charge the electronic device during a first period and the patch antennas to charge the other electronic device during a second period.

In accordance with an embodiment, there is a method of a wireless power transmitting device, including: determining at least one of phases and amplitudes of sub-radio frequency (RF) waves generated from patch antennas; determining power magnitude applied to each of the patch antennas; forming an RF wave in a direction toward an electronic device using the determined power magnitude and the at least one of the phases and the amplitudes of the sub-RF waves; receiving information from the electronic device about power corresponding to the formed RF wave; in response to the received power information being below a threshold, adjusting the power magnitude applied to each patch antenna to form an adjusted RF wave; and in response to the received power information exceeding the threshold, maintaining the power magnitude applied to each patch antenna through the formed RF wave to perform wireless charging of the electronic device.

The method, wherein upon determining that the electronic device is positioned relatively to a side of the wireless power transmitting device, may further include: generating the sub-RF waves from two or more patch antennas positioned relatively to the side of the wireless power transmitting device after a generation of the sub-RF waves from other two or more patch antennas positioned relatively to another side of the wireless power transmitting device.

The sub-RF waves generated from the patch antennas may constructively interfere with each other based on a position of each patch antenna with respect to the electronic device.

The method may further include: detecting a movement of the electronic device while charging the electronic device with the sub-RF waves; varying at least one of the phases and the amplitudes of the sub-RF waves corresponding to the movement of the electronic device; adjusting the power magnitude applied to each patch antenna; and forming an adjusted RF wave in a direction toward the movement of the electronic device using the adjusted power magnitude and the varied at least one of the phases and the amplitudes of the sub-RF waves to charge the electronic device.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
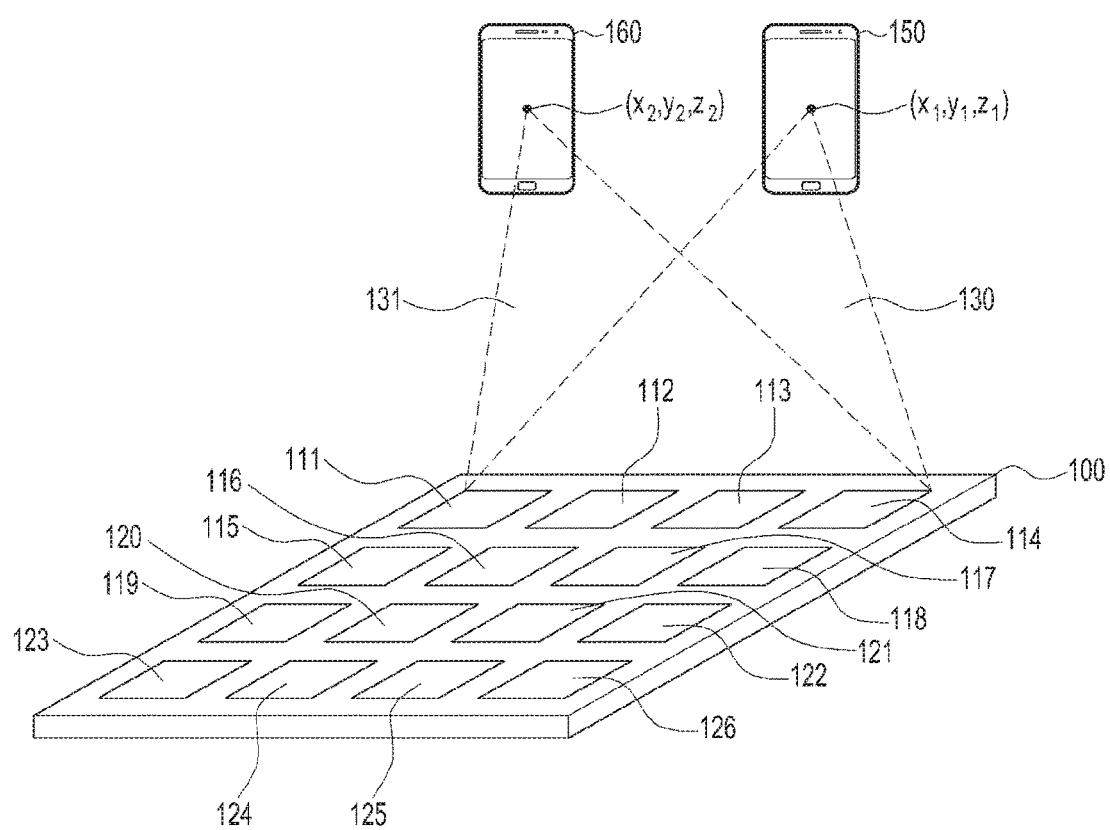
FIG. 1 illustrates a wireless power transmission system, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

For example, examples of the wireless power transmitting device or electronic device, according to various embodiments, may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the wireless power transmitting device or electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame.

According to an embodiment, examples of the wireless power transmitting device or electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler).

According to various embodiments, examples of the wireless power transmitting device or electronic device may at least one of part of a piece of furniture, building/structure or vehicle, an electronic board, an electronic signature receiving device, a projector, or various measurement devices (e.g., devices for measuring water, electricity, gas, or electromagnetic waves).

According to embodiments, the wireless power transmitting device or electronic device may be flexible or may be a combination of the above-enumerated electronic devices. According to an embodiment, the wireless power transmitting device or electronic device is not limited to the above-listed embodiments. As used herein, the term "user" may denote a human using the electronic device or another device (e.g., an artificial intelligent electronic device) using the wireless power transmitting device or electronic device.

FIG. 1 illustrates a wireless power transmission system, according to an embodiment.

The wireless power transmitting device 100 is to wirelessly transmit power to at least one electronic device 150 or 160. According to an embodiment, the wireless power transmitting device 100 includes a plurality of patch antennas 111 to 126. The patch antennas 111 to 126 are not limited as long as each is configured to be an antenna to generate radio frequency (RF) waves. At least one of an amplitude and a phase of RF waves generated by the patch antennas 111 to 126 is adjusted by the wireless power transmitting device 100. For ease of description, RF wave generated by a single patch antenna 111 to 126 is denoted as a sub-RF wave.

According to an embodiment, the wireless power transmitting device 100 adjusts at least one of the amplitude and the phase of each of the sub-RF waves generated from each corresponding patch antennas 111 to 126.

At times, the sub-RF waves may interfere with each other. For example, the sub-RF waves may constructively interfere, such as supplementing a strength of a sub-RF wave with another sub-RF wave, with each other at one point or destructively interfere, such as at least two sub-RF waves canceling each other or diminishing an intensity of one sub-RF wave by another sub-RF wave, at another point. According to an embodiment, the wireless power transmitting device 100 may adjust at least one of the amplitude and phase of each of the sub-RF waves generated by the patch antennas 111 to 126 so that the sub-RF waves may constructively interfere with each other at a first point (x1, y1, z1). In one configuration, the first point (x1, y1, z1) is a position or location of the electronic device 150.

For example, the wireless power transmitting device 100 determines that an electronic device 150 is positioned at the first point (x1, y1, z1). Here, the position of the electronic device 150 may be the position where, for instance, a power receiving antenna of the electronic device 150 is located. A method to determine the position of the electronic device 150 is described below in greater detail. In order for the electronic device 150 to wirelessly receive power at a higher transmission efficiency, the sub-RF waves need to constructively interfere with each other at the first point (x1, y1, z1). Accordingly, the wireless power transmitting device 100 controls the patch antennas 111 to 126 so that the sub-RF waves constructively interfere with each other at the first point (x1, y1, z1). In an example, controlling the patch antennas 111 to 126 means controlling the magnitude of signals inputted to the patch antennas 111 to 126 or controlling the phase (or delay) of signals inputted to the patch antennas 111 to 126. Further, beamforming, a technique to control RF waves to be subject or exposed to constructive interference at a certain point, would readily be apparent after an understanding of the disclosure of this application. It is also apparent after an understanding of the disclosure of this application that the beamforming used herein is not particularly limited in type. For example, various beamforming methods may be adopted as disclosed in U.S. Patent Application Publication No. 2016/0099611, U.S. Patent Application Publication No. 2016/0099755, and U.S. Patent Application Publication No. 2016/0100124, which are hereby incorporated by reference. An RF wave formed through beamforming is referred to as a pocket of energy.

Thus, an RF wave 130 formed by the sub-RF waves has a maximum amplitude at the first point (x1, y1, z1). At the first point (x1, y1, z1), the electronic device 150 receives power at a relatively higher efficiency. Further, the wireless power transmitting device 100 also detects an electronic device 160 positioned at a second point (x2, y2, z2). The wireless power transmitting device 100 controls the patch antennas 111 to 126 so that the sub-RF waves constructively interfere with each other at the second point (x2, y2, z2) in order to charge the electronic device 160. Thus, an RF wave 131 formed by the sub-RF waves has a maximum amplitude at the second point (x2, y2, z2). At the second point (x2, y2, z2), the electronic device 160 receives power at a relatively higher efficiency.

In an embodiment, the electronic device 150 is positioned relatively to the electronic device 160 and the wireless power transmitting device 100 at a right side thereof. In this embodiment, the wireless power transmitting device 100 applies a relatively greater delay to sub-RF waves formed by the patch antennas (e.g., 114, 118, 122, and 126) positioned relatively to a right side of or closest to the electronic device 150. In other words, a predetermined time after the sub-RF waves are formed by patch antennas (e.g., 111, 115, 119, and 123) positioned relatively to a left side of or furthest to the electronic device 150, sub-RF waves are generated by the patch antennas (e.g., 114, 118, 122, and 126) positioned relatively to the right side. Thus, the sub-RF waves are configured to simultaneously meet at a relatively right-side point. In other words, the sub-RF waves may constructively interfere with each other at the relatively right-side point. Where beamforming is conducted at a relatively middle point of the wireless power transmitting device 100, the wireless power transmitting device 100 applies substantially the same delay to the left-side patch antennas (e.g., 111, 115, 119, and 123) and the right-side patch antennas (e.g., 114, 118, 122, and 126). Further, where beamforming is conducted at a relatively left-side point, the wireless power transmitting device 100 may apply a greater delay to the left-side patch antennas (e.g., 111, 115, 119, and 123) than to the right-side patch antennas (e.g., 114, 118, 122, and 126) of the wireless power transmitting device 100. Also, according to an embodiment, the wireless power transmitting device 100 substantially at a same time or simultaneously generates sub-RF waves through all of the patch antennas 111 to 126 and perform beamforming by adjusting the phase corresponding to the above-described delay.

As set forth above, the wireless power transmitting device 100 determines the position of the electronic devices 150 and 160 and enables the sub-RF waves to constructively interfere with each other at the determined position, allowing for wireless charging at a higher transmission efficiency. Further, the wireless power transmitting device 100 performs high-transmission efficiency wireless charging upon detection of the position of the electronic devices 150 and 160.

Figure 2:
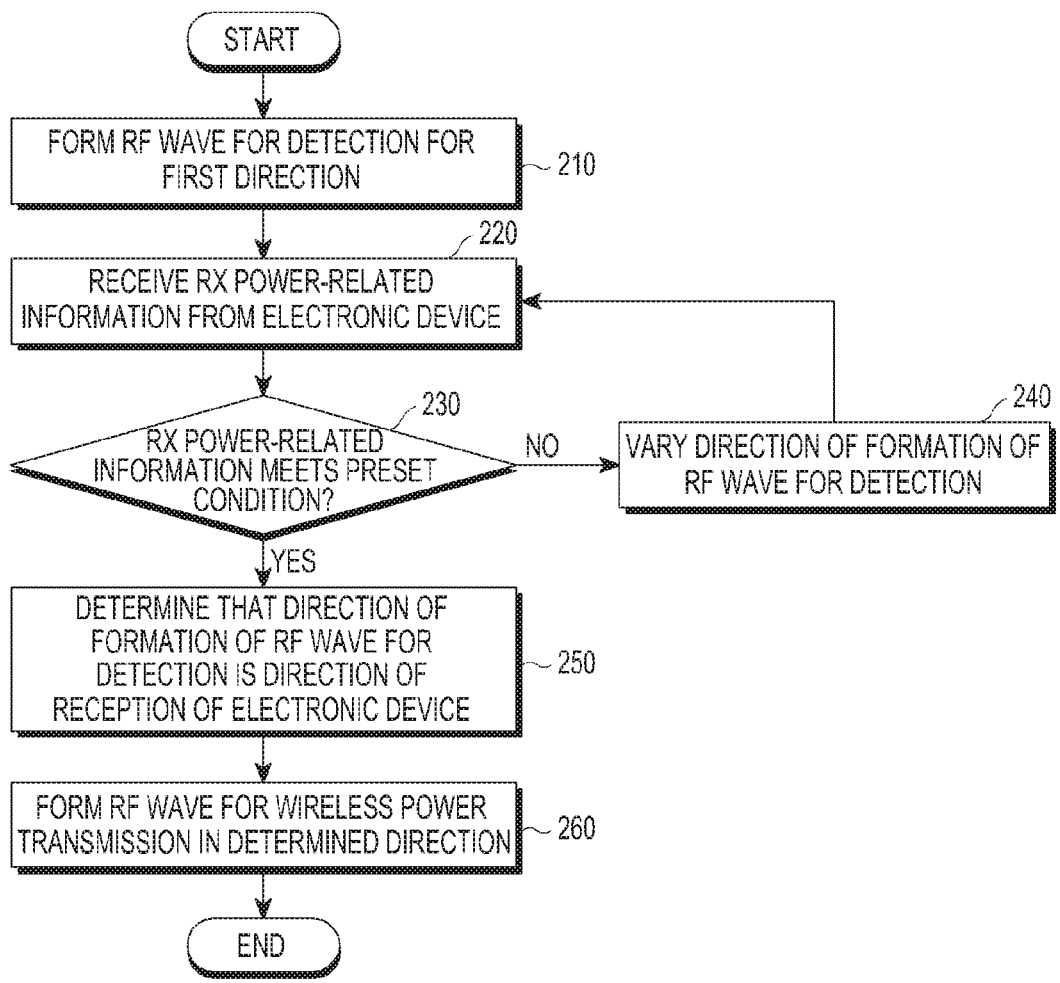
FIG. 2 is a flowchart illustrating a method to control a wireless power transmitting device, according to an embodiment.

FIG. 2 is a flowchart illustrating a method to control a wireless power transmitting device, according to an embodiment.

In operation 210, the wireless power transmitting device, for example, the wireless power transmitting device 100 described in FIG. 1, forms an RF for detecting an electronic device, such as the electronic device 150 of FIG. 1, in a first direction. In operation 220, the wireless power transmitting device receives power-related information from the electronic device. In an example, the power-related information is information related to power that the electronic device receives from the wireless power transmitting device. For example, the power-related information includes magnitude of voltage, current, temperature, or power at a particular point, which is described below in further detail. The power-related information is not limited to such information; and additional information related to the magnitude of power that the electronic device receives from the wireless power transmitting device may be included. In operation 230, the wireless power transmitting device determines whether the received power-related information meets a preset condition. For example, the wireless power transmitting device determines whether a voltage value an output end of an electronic device rectifier exceeds a preset threshold. The voltage value at the output end of the rectifier exceeding the preset threshold voltage is indicative that the electronic device has wirelessly received a sufficient magnitude of power.

In contrast, upon failure to meet the preset condition, at operation 240, the wireless power transmitting device varies or adjusts a direction in which the RF wave is to be formed. Failure to meet the preset condition is determined to be the electronic device's failure to receive a sufficient amount or magnitude of power. The wireless power transmitting device varies the direction of RF wave until the preset condition is satisfied. In an embodiment, the wireless power transmitting device varies or adjusts a transmission of the RF wave in a particular direction by controlling at least one of the amplitude and phase of the sub-RF waves produced by particular antennas in the wireless power transmitting device so that the sub-RF waves constructively interfere with each other at a point in the particular direction. Upon meeting the preset condition, in operation 250, the wireless power transmitting device determines that the direction of RF wave is in the direction in which the electronic device is located or positioned. In operation 260, the wireless power transmitting device forms an RF wave for wireless power transmission in the determined direction. Meanwhile, as described above, varying the direction of formation of RF wave until the preset condition renders determination of the position of the electronic device to take long.

Figure 3:
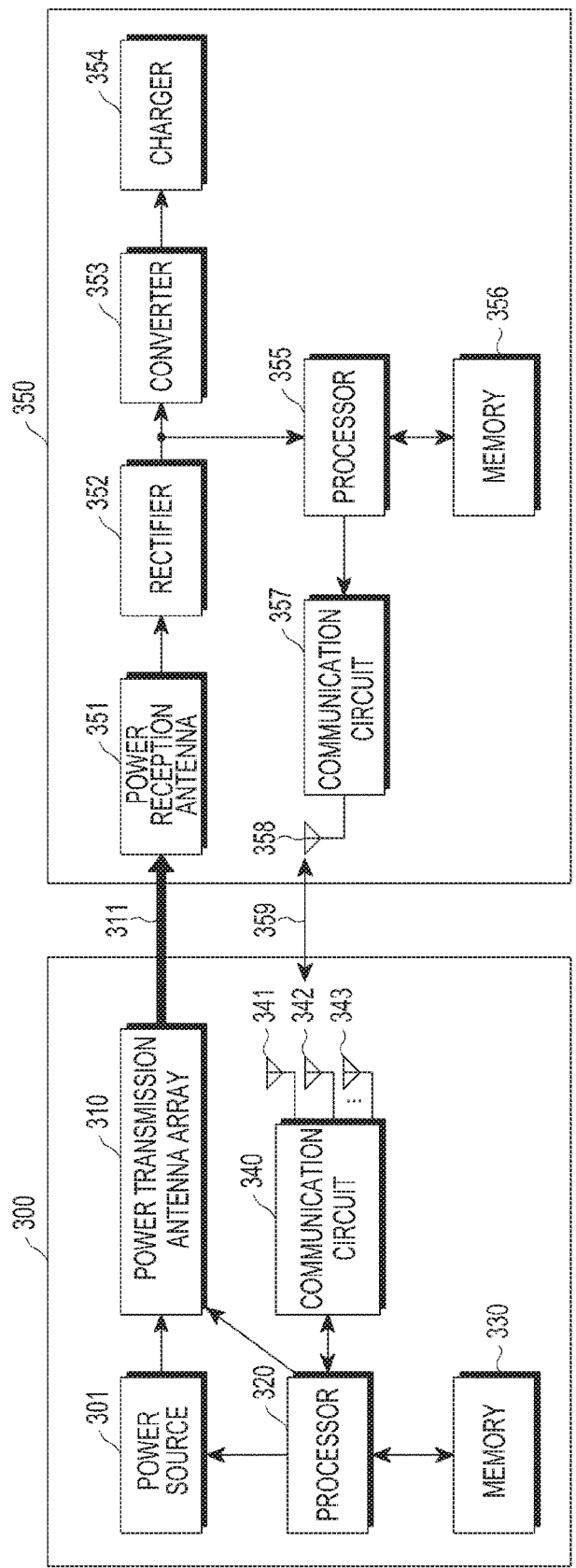
FIG. 3 is a block diagram illustrating a wireless power transmitting device, according to an embodiment.

FIG. 3 is a block diagram illustrating a wireless power transmitting device, according to an embodiment.

A wireless power transmitting device 300 includes a power source 301, a power transmission antenna array (or an antenna array for power transmission) 310, a processor 320, a memory 330, a communication circuit 340, and antennas 341 to 343 for communication. An electronic device 350 is a device configured to wirelessly receive power and includes a power reception antenna (or an antenna for power reception) 351, a rectifier 352, a converter 353, a charger 354, a processor 355, a memory 356, a communication circuit 357, and an antenna 358 for communication.

The power source 301 supplies power to be transmitted to the power transmission antenna array 310. The power source 301 supplies, for instance, direct current (DC) power, in which case the wireless power transmitting device 300 may further include an inverter (not shown) that converts DC power into alternating current (AC) power and delivers the AC power to the power transmission antenna array 310. Also, according to an embodiment, the power source 301 supplies AC power to the power transmission antenna array 310.

The power transmission antenna array 310 includes patch antennas. For example, the patch antennas as shown in FIG. 1 are in the power transmission antenna array 310. A number or array form of the patch antennas is not limited. The power transmission antenna array 310 may form an RF wave using the power received from the power source 301. The power transmission antenna array 310 forms the RF wave in a particular direction under the control of the processor 320. In an example, the RF wave is formed in a particular direction by controlling at least one of the amplitude and phase of sub-RF waves so that the sub-RF waves constructively interfere with each other at a point in the particular direction. For example, the processor 320 controls each of phase shifters connected to the power transmission antenna array 310 or of at least one power amplifier included or connected to the power transmission antenna array 310, which is described below in more detail with reference to FIGS. 10A and 10B. Meanwhile, the power transmission antenna array 310 transmits power and may be referred to as an antenna for power transmission.

The processor 320 determines the direction in which the electronic device 350 is positioned to form the RF wave based on the determined direction. In other words, the processor 320 controls the patch antennas of the power transmission antenna array 310 that generates sub-RF waves so that the sub-RF waves constructively interfere with each other at a point in the determined direction. For example, the processor 320 controls at least one of the amplitude and phase of the sub-RF wave generated from each patch antenna by controlling the patch antennas or at least one of phase shifter (not shown) and a power amplifier (not shown) connected with the patch antennas.

The processor 320 determines the direction in which the electronic device 350 is positioned using communication signals received from the antennas 341 to 343. In other words, the processor 320 controls at least one of the amplitude and phase of the sub-RF wave generated from each patch antenna using the communication signals received from the communication antennas 341 to 343. Although three communication antennas 341 to 343 are shown, this is merely an example, and the number of communication antennas is not limited. For instance, at least two communication antennas 341 to 342 may be included in the embodiment of the wireless power transmitting device 300. According to an embodiment, at least three communication antennas 341 to 343 are included to determine a three-dimensional (3D) direction, e.g., values θ and φ in the spherical coordinate system. Specifically, the communication antenna 358 of the electronic device 350 transmits a communication signal 359. According to an embodiment, the communication signal 359 includes identification information identifying the electronic device 350 or includes information required to wireless charging. Thus, the wireless power transmitting device 300 determines the direction of the electronic device 350 using the communication signal for wireless charging, even without a separate hardware structure. Further, reception times of the communication signal 359 at the communication antennas 341 to 343 may differ. This is described below in greater detail with reference to FIG. 4.

Figure 4:
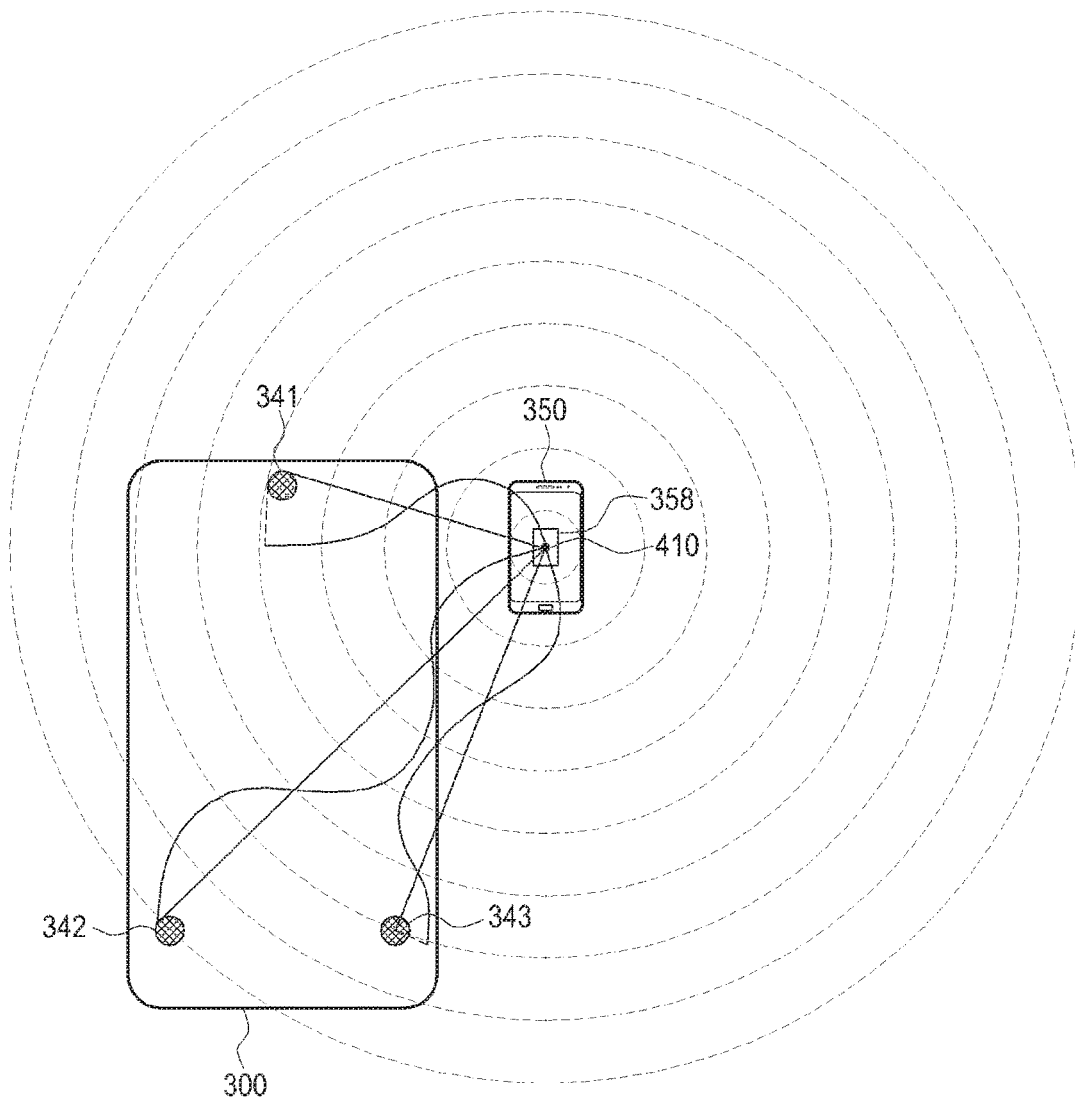
FIG. 4 illustrates a difference in time of reception of communication signals, according to an embodiment.

As illustrated in FIG. 4, the electronic device 350 is positioned or located at a first point 410. The electronic device 350 generates a communication signal that propagates, in space, in a shape of spherical waves as shown in FIG. 4. The spherical waves propagate from the first point 410. The first point 410 is a point where the communication antenna 358 of the electronic device 350 is positioned. Accordingly, a time in which the communication signal from the electronic device 350, through the communication antenna 358, is received at a first communication antenna 341, a time when the communication signal is received at a second communication antenna 342, and a time when the communication signal is received at a third communication antenna 343 may differ. For example, the first communication antenna 341 closest to the first point 410 first receive the communication signal, the second communication antenna 342 subsequently receives the communication signal next, and the third communication antenna 343 lastly receives the communication signal. FIG. 4 shows mere an example, and although the communication signal has a directional waveform, the times of reception by the communication antennas 341, 342, and 343 may be different. According to an embodiment, the wireless power transmitting device 300 may include three or more communication antennas, e.g., for the purpose of determining the direction of reception of the communication signal in a 3D space.

The processor 320 of the wireless power transmitting device 300 determines a direction of the electronic device 350 relative to the wireless power transmitting device 300 using the times (e.g., t1, t2, and t3) of reception of the communication signal by the communication antennas 341, 342, and 343. For example, the processor 320 determines a direction of the electronic device 350 relative to the wireless power transmitting device 300 by determining time differences t1-t2, t2-t3, and t3-t1 between the times t1, t2, and t3. For example, as t1-t2 becomes closer to 0, the electronic device 350 may be determined to be more likely to be positioned on the line perpendicularly passing through the center of the line connecting the communication antenna 341 with the communication antenna 342. Further, as t1-t2 is a relatively greater positive value, the electronic device 350 may be determined to be more likely to be positioned closer to the communication antenna 342. Further, as t1-t2 is a relatively greater negative value, the electronic device 350 may be determined to be more likely to be positioned closer to the communication antenna 341. The wireless power transmitting device 300 determines the 3D direction of the electronic device 350 relative to the wireless power transmitting device 300 by considering all of t1-t2, t2-t3, and t3-t1. The processor 320 determines a relative direction of the electronic device 350 using a process or method to determine a direction and stored in, for instance, the memory 330. According to an embodiment, the processor 320 determines a relative direction of the electronic device 350 using a lookup table between the direction of the electronic device and the difference in reception time per communication antenna, which is stored in, for example, the memory 330. The wireless power transmitting device 300 (or the processor 320) determines a relative direction of the electronic device 350 in various manners. For example, the wireless power transmitting device 300 (or the processor 320) determines a relative direction of the electronic device 350 in various ways, such as time difference of arrival (TDOA) or frequency difference of arrival (FDOA), and determining process of determining the direction of received signal is not limited in type.

Meanwhile, according to an embodiment, the wireless power transmitting device 300 determines a relative direction of the electronic device 350 based on the phase of a communication signal received. As illustrated in FIG. 4, the distances between the communication antenna 358 of the electronic device 350 and the communication antennas 341, 342, and 343 of the wireless power transmitting device 300 differ. Thus, the communication signal generated from the communication antenna 358 and received at each communication antenna 341, 342, and 343 has a different phase. The processor 320 determines the direction of the electronic device 350 based on the differences in phase of the communication signal received by the communication antennas 341, 342, and 343.

The processor 320 then forms an RF wave in the direction of the electronic device 350 by controlling the power transmission antenna array 310 based on the direction of the electronic device 350. Further, the processor 320 identifies the electronic device 350 using information contained in the communication signal 359.

The communication signal 359 includes a unique identifier and a unique address of the electronic device 350. The communication circuit 340 processes the communication signal 359 and provides information to the processor 320. The communication circuit 340 and the communication antennas 341, 342, and 343 may be manufactured based on various communication schemes, such as wireless-fidelity (Wi-Fi), bluetooth, zig-bee, and bluetooth low energy (BLE), which are not limited to a particular type. Further, the communication signal 359 includes rated power information about the electronic device 350. The processor 320 determines whether to charge the electronic device 350 based on at least one of the unique identifier, unique address, and rated power information of the electronic device 350. The processor 320 may include one or more of a central processing unit (CPU), an application processor (AP), or a communication processor (CP), and the processor 320 may be implemented as a micro-controller unit or a mini computer.

Further, the wireless power transmitting device 300 processes the communication signal 359 to identify the electronic device 350, to transmit power to the electronic device 350, to send a request for RX power-related information to the electronic device 350, and to receive power-related information from the electronic device 350. In other words, the communication signal 359 may be used in a process for a subscription, command, or request between the wireless power transmitting device 300 and the electronic device 350.

Meanwhile, the processor 320 controls the power transmission antenna array 310 to form an RF wave 311 in the determined direction of the electronic device 350. The processor 320 forms the RF wave to detect and determine the distance to the electronic device 350 using another communication signal subsequently received as a feedback, which is described below in greater detail.

Thus, the processor 320 determines the direction of the electronic device 350 and the distance to the electronic device 350 and, thus, determines the position of the electronic device 350. The processor 320 controls the patch antennas so that the sub-RF waves generated from the patch antennas constructively interfere with each other at the position of the electronic device 350. Therefore, the RF wave 311 may be transferred to the power reception antenna 351 at a relatively high transmission efficiency. The power reception antenna 351 at the electronic device 350 is an antenna configured to receive RF waves. Further, the power reception antenna 351 may be implemented in the form of an array of a plurality of antennas. The AC power received by the power reception antenna 351 may be rectified into DC power by the rectifier 352. The converter 353 may convert the DC power into a voltage required and provide the voltage to the charger 354. The charger 354 may charge a battery (not shown). Although not shown, the converter 353 may provide the converted power to a power management integrated circuit (PMIC) (not shown), and the PMIC (not shown) may provide power to various hardware structures of the electronic device 350.

Also, the processor 355 monitors the voltage at the output end of the rectifier 352. For example, the electronic device 350 may further include a voltage meter connected to the output end of the rectifier 352. The processor 355 receives a voltage value from the voltage meter and monitors the voltage at the output end of the rectifier 352. The processor 355 provides information containing the voltage value at the output end of the rectifier 352 to the communication circuit 357. Although the charger 354, converter 353, and PMIC may be implemented in different hardware devices, at least two of these devices may be integrated into a single hardware device.

Further, the voltage meter may be implemented in various types, such as an electrodynamic instrument voltage meter, an electrostatic voltage meter, or a digital voltage meter, without limited in type thereto. The communication circuit 357 transmits the communication signal including RX power-related information using the communication antenna 358. The received power-related information is information associated with the magnitude of power received, such as, for instance, the voltage at the output end of the rectifier 352, and includes a current at the output end of the rectifier 352. In this embodiment, the electronic device 350 may further include a current meter to measure current at the output end of the rectifier 352. The current meter may be implemented in various types, such as a DC current meter, AC current meter, or digital current meter, without limited in type thereto. Further, the received power-related information may be measured at any point of the electronic device 350, but not only at the output or input end of the rectifier 352.

Further, as set forth above, the processor 355 transmits a communication signal 359 including identification information about the electronic device 350. The memory 356 stores a process or method to control various hardware devices or elements in the electronic device 350.

Figure 5:
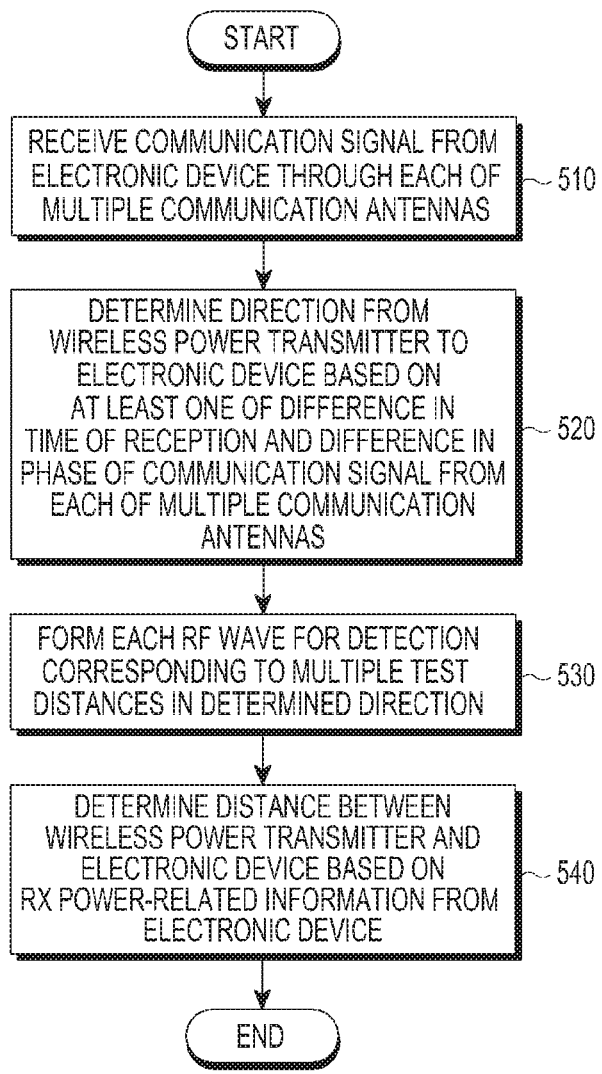
FIG. 5 is a flowchart illustrating a method to control a wireless power transmitting device, according to an embodiment.

FIG. 5 is a flowchart illustrating a method to control a wireless power transmitting device, according to an embodiment.

In operation 510, a wireless power transmitting device (or a processor) receives a communication signal from an electronic device through each of a plurality of communication antennas. In operation 520, the wireless power transmitting device determines the direction from the wireless power transmitting device to the electronic device based on at least one of differences in time of reception and differences in phase between communication signals respectively received through the communication antennas.

In operation 530, the wireless power transmitting device (or a plurality of antenna patches) controls the patch antennas to form the RF wave corresponding to each of test distances in the determined direction.

In operation 540, the wireless power transmitting device determines the distance between the wireless power transmitting device and the electronic device based on the received power-related information from the electronic device. Specifically, the wireless power transmitting device provides a first magnitude of power to the patch antennas. The RF wave has a first distance in which case the wireless power transmitting device receives RX power-related information (for instance, voltage at the output end of the rectifier of the electronic device) from the electronic device. Further, the wireless power transmitting device provides a second magnitude of power to the patch antennas. The RF wave has a second distance in which case the wireless power transmitting device receives RX power-related information (for instance, voltage at the output end of the rectifier of the electronic device) from the electronic device. In an example, varying the distance of formation of the RF wave means that the wireless power transmitting device varies the point where the sub-RF waves constructively interfere with each other. For example, the distance of formation of RF wave is varied by changing the magnitude of power applied to the patch antennas.

In an embodiment, where the electronic device is positioned away from the wireless power transmitting device by a second distance, a relatively large magnitude of power is received where the wireless power transmitting device forms a second distance of RF wave. Accordingly, the voltage at the output end of the electronic device has a relatively large value. The wireless power transmitting device determines that the electronic device is positioned away from the wireless power transmitting device at the second distance, based on the received power-related information (for instance, the voltage at the output end of the rectifier) from the electronic device. The wireless power transmitting device may pre-store information about the relationship between the distance and magnitude of power applied and may determine the distance using the relationship information. Further, according to an embodiment, the wireless power transmitting device may not determine the distance to the electronic device, which is described below in greater detail.

The wireless power transmitting device determines the position of the electronic device by determining the distance from the wireless power transmitting device and the direction of the electronic device. The wireless power transmitting device controls each of the patch antennas so that the sub-RF waves constructively interfere with each other at the position of the electronic device.

Figure 6:
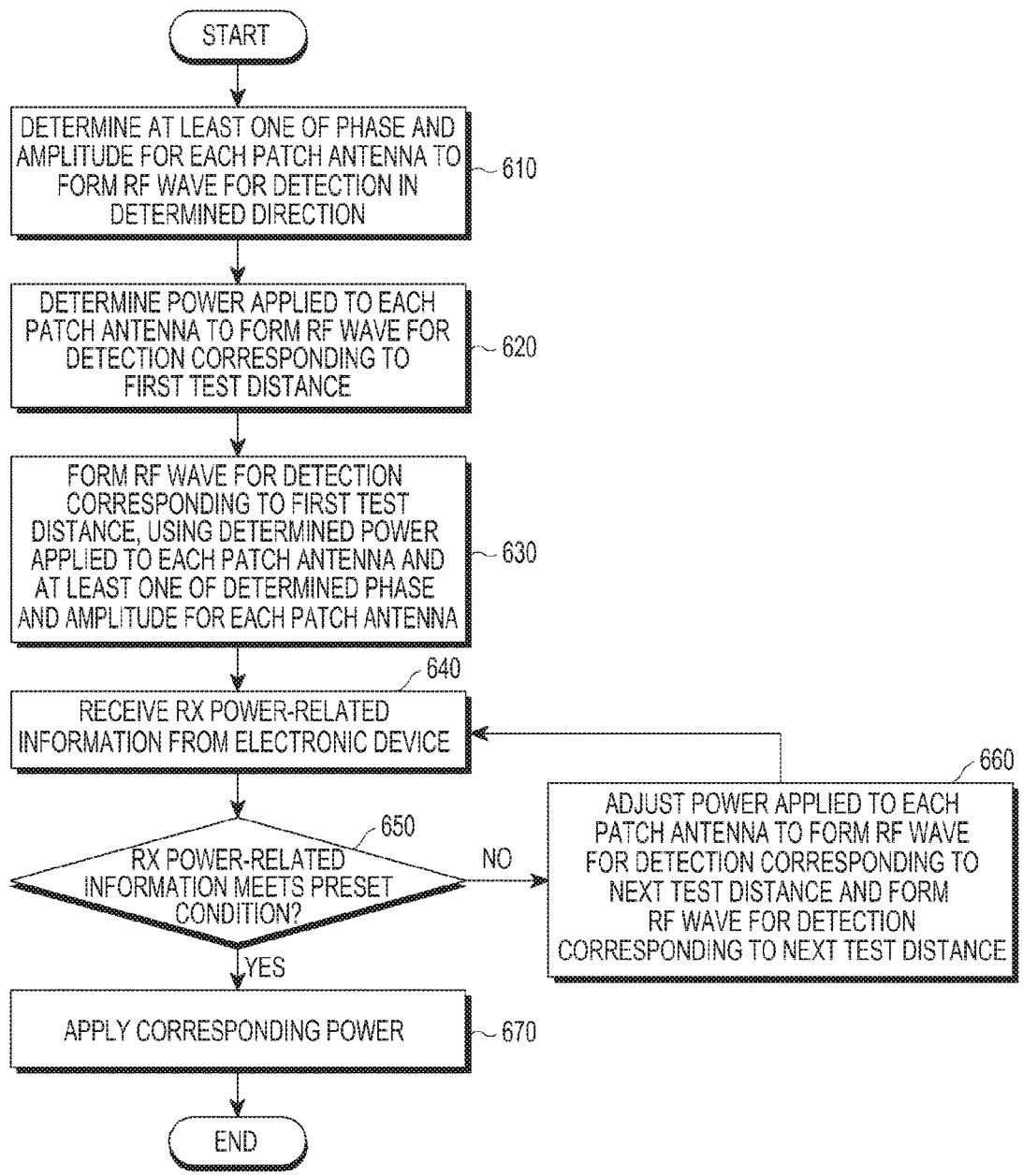
FIG. 6 is a flowchart illustrating a method to control a wireless power transmitting device, according to an embodiment.
Figure 7:
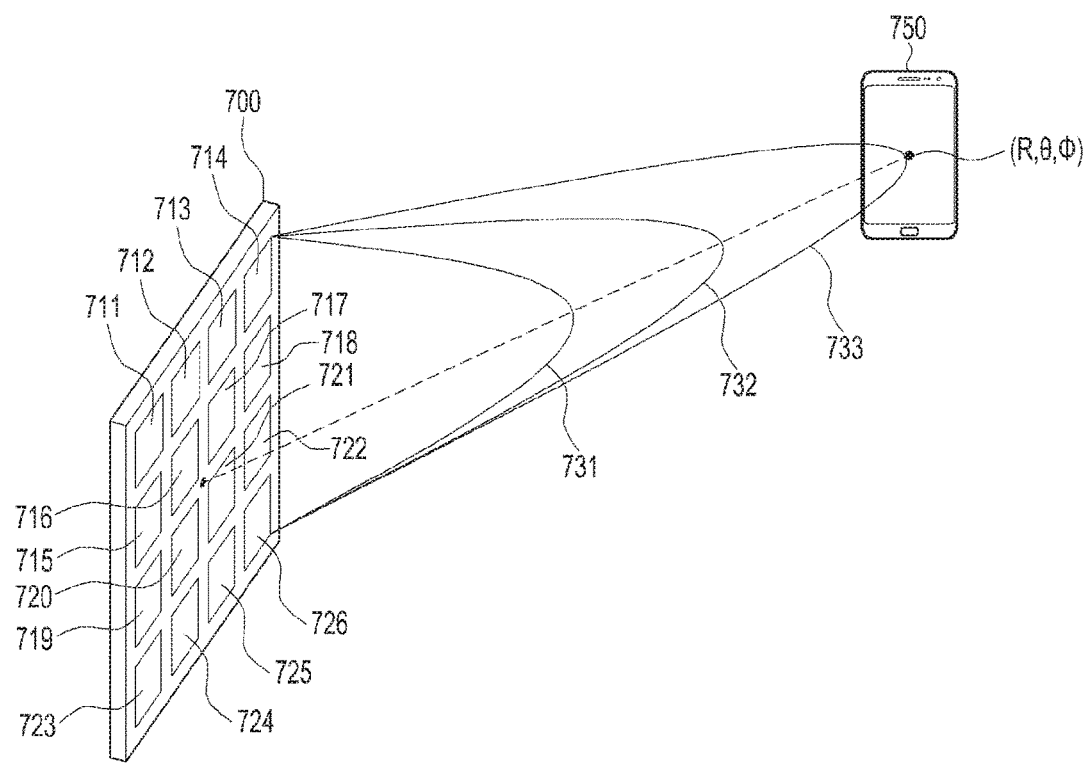
FIG. 7 is a concept view illustrating a configuration to determine the distance between a wireless power transmitting device and an electronic device, according to an embodiment.

FIG. 6 is a flowchart illustrating a method to control a wireless power transmitting device, according to an embodiment. The embodiment shown in FIG. 6 is described in greater detail with reference to FIG. 7. FIG. 7 is a concept view illustrating a configuration to determine the distance between a wireless power transmitting device and an electronic device 750 according to an embodiment of the present disclosure.

In operation 610, as illustrated in, e.g., FIG. 7, the wireless power transmitting device 700 determines at least one of the phase and amplitude of sub-RF waves generated from the patch antennas 711 to 726 to form an RF wave for detection in a determined direction $(\theta,\varphi)$. For example, upon determining that the electronic device 750 is positioned relatively to a right side of the wireless power transmitting device 700, the wireless power transmitting device 700 applies a relatively large delay to sub-RF waves generated from patch antennas positioned relatively to the right side, compared to sub-RF waves generated from patch antennas positioned relatively to a left side of the wireless power transmitting device 700, so that the sub-RF waves generated from the patch antennas 711 to 726 constructively interfere with each other, by considering the position or the location of each patch antenna 711 to 726 in the wireless power transmitting device 700 with respect to the electronic device 750. In other words, the sub-RF waves from the patch antennas positioned relatively at the right side of the wireless power transmitting device 700 may be generated after or within a predetermined time delay after the sub-RF waves from the patch antennas positioned relatively to the left side of the wireless power transmitting device 700, and accordingly, the sub-RF waves from the patch antennas may simultaneously meet, that is, constructively interfere with each other at a relatively right-side point. Furthermore, as described above, the wireless power transmitting device 700 forms sub-RF waves from all the patch antennas 711 to 726 substantially at a same time. In this case, the wireless power transmitting device 700 adjusts the phase of the sub-RF waves respectively generated from the patch antennas 711 to 726, allowing the sub-RF waves to constructively interfere with each other relatively to the right side of the wireless power transmitting device 700.

In one illustrative example, upon determining that the electronic device 750 is positioned relatively at an upper side of the wireless power transmitting device 700, the wireless power transmitting device 700 applies a relatively large delay to sub-RF waves generated from patch antennas positioned relatively at an upper side of the wireless power transmitting device 700 so that the sub-RF waves generated from the patch antennas 711 to 726 constructively interfere with each other relatively at an upper side. In other words, the sub-RF waves from the patch antennas positioned relatively at an upper side are generated later than, after, or subsequent to the sub-RF waves from the patch antennas positioned relatively at a lower side. Accordingly, the sub-RF waves from the patch antennas simultaneously meet, that is, constructively interfere with each other at a relatively upper-side point. The wireless power transmitting device 700 applies different delays to the patch antennas 711 to 726, respectively, arranged in two-dimension (2D), allowing or enabling the RF wave generated by each of the patch antennas 711 to 726 to have a different phase.

In operation 620, the wireless power transmitting device 700 determines the magnitude of power applied to each patch antenna 711 to 726 so that an RF wave 731 for detection is formed corresponding to a first test distance. According to an embodiment, the wireless power transmitting device 700 directly determines the magnitude of a first test power provided to the patch antennas 711 to 726 without determining distance. In an example, the first test distance or the magnitude of the first test power has a default value.

In operation 630, the wireless power transmitting device 700 forms the RF wave 731 corresponding to the first test distance using the determined power applied to each patch antenna 711 to 726 and at least one of the determined phase and amplitude of the RF wave generated by each patch antenna 711 to 726.

In operation 640, the wireless power transmitting device 700 receives from the electronic device 750 information related to power received by the electronic device 750, for instance, RX power-related information. In operation 650, the wireless power transmitting device 700 determines whether the received power-related information meets a preset condition. For example, the wireless power transmitting device 700 determines whether the voltage at the output end of the rectifier of the electronic device 750, which is the received power-related information, exceeds a preset threshold, such as an optimal power operating threshold for the electronic device 750 to operate at its optimum capacity.

In response to the received power-related information failing to meet the preset condition, in operation 660, the wireless power transmitting device 700 adjusts the power applied to each patch antenna 711 to 726 to form an RF wave 732 for detection corresponding to a next test distance.

As set forth above, the wireless power transmitting device 700 determines the magnitude of next test power without determining a test distance and applies the same, that is, the next test power, to each patch antenna 711 to 726. Further, although FIG. 7 illustrates that the wireless power transmitting device 700 increases the test distance, that is, the magnitude of power to be supplied or applied, such is merely an example. The wireless power transmitting device 700 may also reduce the test distance, for instance, the magnitude of power applied. Also, the wireless power transmitting device 700 adjusts the magnitude of power applied to each patch antenna 711 to 726 until the received power-related information meets the preset condition.

In response to the received power-related information meeting the preset condition, in operation 670, the wireless power transmitting device 700 maintains the power applied to each patch antenna to send out an RF wave and performs wireless charging. In the embodiment shown in FIG. 7, where an RF wave 733 is formed to have a third test distance, the received power-related information may be determined to be met. The wireless power transmitting device 700 maintains the magnitude of power applied to each patch antenna 711 to 726 so as to maintain the formation of the RF wave 733 in the third test distance. The wireless power transmitting device 700 determines that the distance to the electronic device 750 is the third test distance R or controls power applied to each patch antenna 711 to 726, without determining the distance to the electronic device 750.

As described above, the wireless power transmitting device 700 determines the distance to the electronic device 750 and controls the patch antennas so that the sub-RF waves constructively interfere with each other at a corresponding point, allowing for wireless transmission at a relatively high transmission efficiency.

Figure 8:
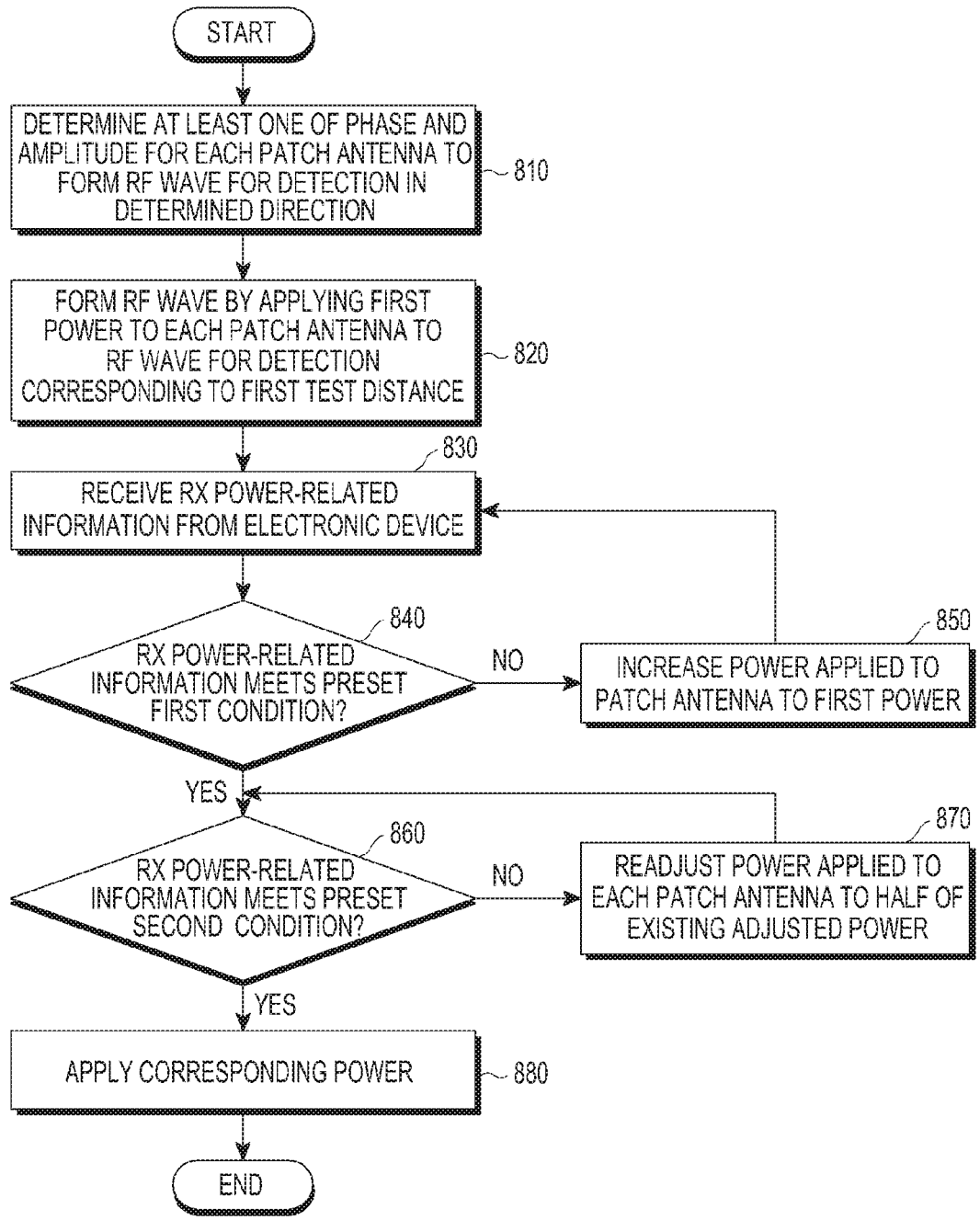
FIG. 8 is a flowchart illustrating a method to control a wireless power transmitting device, according to an embodiment.
Figure 9:
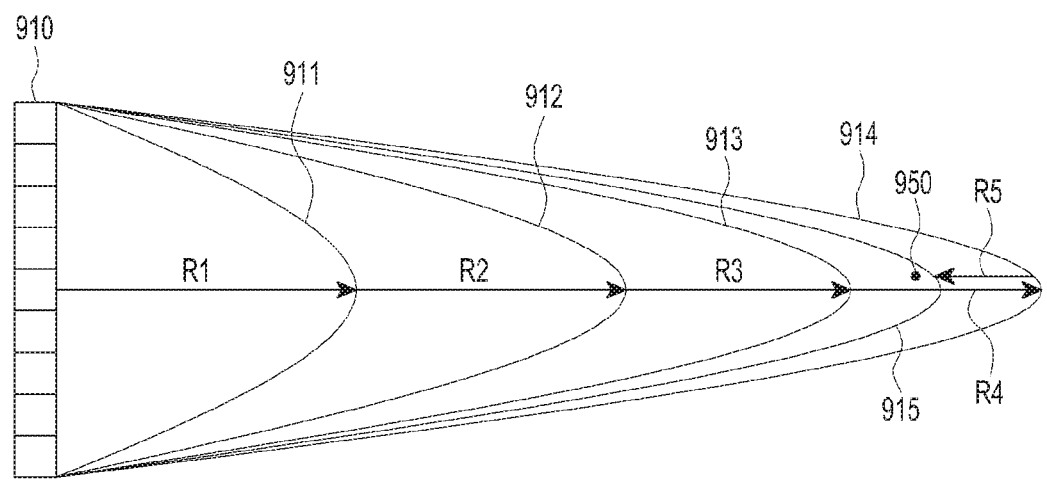
FIG. 9 is a concept view illustrating a binary detection method, according to an embodiment.

FIG. 8 is a flowchart illustrating a method to control a wireless power transmitting device, according to an embodiment. The embodiment shown in FIG. 8 is described in greater detail with reference to FIG. 9. FIG. 9 is a concept view illustrating a binary detection method, according to an embodiment.

Operations 810 to 830 are substantially similar to operations 610 to 630 of FIG. 6, and the description previously provided for those functions are incorporated herein.

As illustrated in FIG. 9, in operation 840, the wireless power transmitting device determines whether the received power-related information meets a preset first condition. In an embodiment, the first condition is a condition corresponding to where the distance between the electronic device and the point where the sub-RF waves constructively interfere with each other is less than a first threshold. As the distance between the electronic device and the point where the sub-RF waves constructively interfere with each other increases, the electronic device receives a relatively small or low magnitude of power. Accordingly, e.g., the voltage at the output end of the rectifier of the electronic device has a relatively small value. Resultantly, the distance between the electronic device and the point where the sub-RF waves constructively interfere with each other is associated with RX power-related information about the electronic device, such as, the voltage at the output end of the rectifier. For example, the voltage at the output end of the rectifier of the electronic device being more than 5V and not more than 10V may be the first condition, and exceeding 10V may be a second condition, wherein the voltage values are mere examples. The second condition may be a condition corresponding to where the distance between the electronic device and the point where the sub-RF waves constructively interfere with each other is less than a second threshold. The second threshold may be smaller than the first threshold.

Further, the above-described conditions may be set to be different per type of electronic device.

Upon determining that the received power-related information fails to meet the first condition, in operation 850, the wireless power transmitting device increases the power applied to the patch antenna 910 by first power. Referring to FIG. 9, it can be shown that the patch antenna 910 used to first form an RF wave 911 in a distance R1 forms an RF wave 912 in a distance R2. This can be attributed to an increase of power applied to the patch antenna 910 to the first power. Further, the wireless power transmitting device increases the power applied to the patch antenna 910 to the first power until the received power-related information meets the preset first condition. Thus, as shown in FIG. 9, RF waves 913 and 914 are formed from the patch antenna 910 at points R3 and R4, respectively.

Upon determining that the received power-related information meets the first condition, in operation 860, the wireless power transmitting device determines whether the received power-related information meets a preset second condition.

Upon determining that the received power-related information fails to meet the second condition, in operation 870, the wireless power transmitting device readjusts the power applied to the patch antenna 910 to a half of the adjusted existing power. For example, as shown in FIG. 9, the wireless power transmitting device reduces the power applied to each patch antenna 910 by a half of the first power, which is adjusted existing power. Accordingly, an RF wave 915 is formed at a distance positioned R5 behind point R4. Upon determining that the received power-related information meets the preset second condition, in operation 880, the wireless power transmitting device maintains the magnitude of power applied to the patch antenna. For example, where the electronic device is positioned at a point 950, the second condition is met, and the wireless power transmitting device conducts wireless charging on the electronic device positioned at the point 950. At least some of the advantages of above process includes enabling a quick determination of the distance between the wireless power transmitting device and the electronic device or a determination of the magnitude of power applied to each patch antenna for swift wireless charging.

Figure 10A:
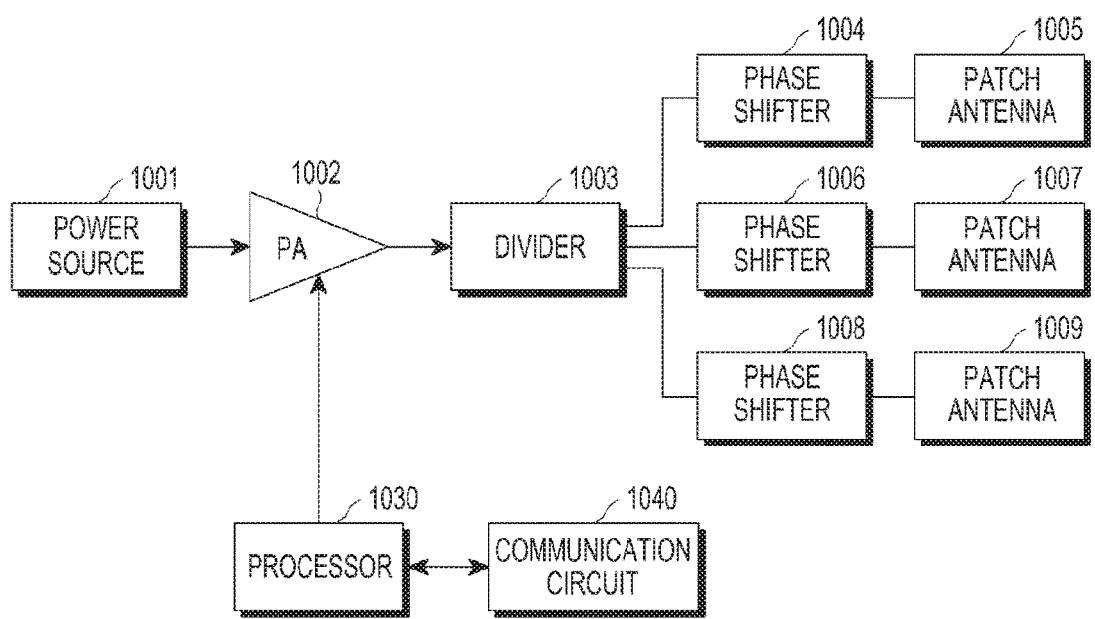
FIGS. 10A and 10B are block diagrams illustrating a wireless power transmitting device, according to an embodiment.
Figure 10B:
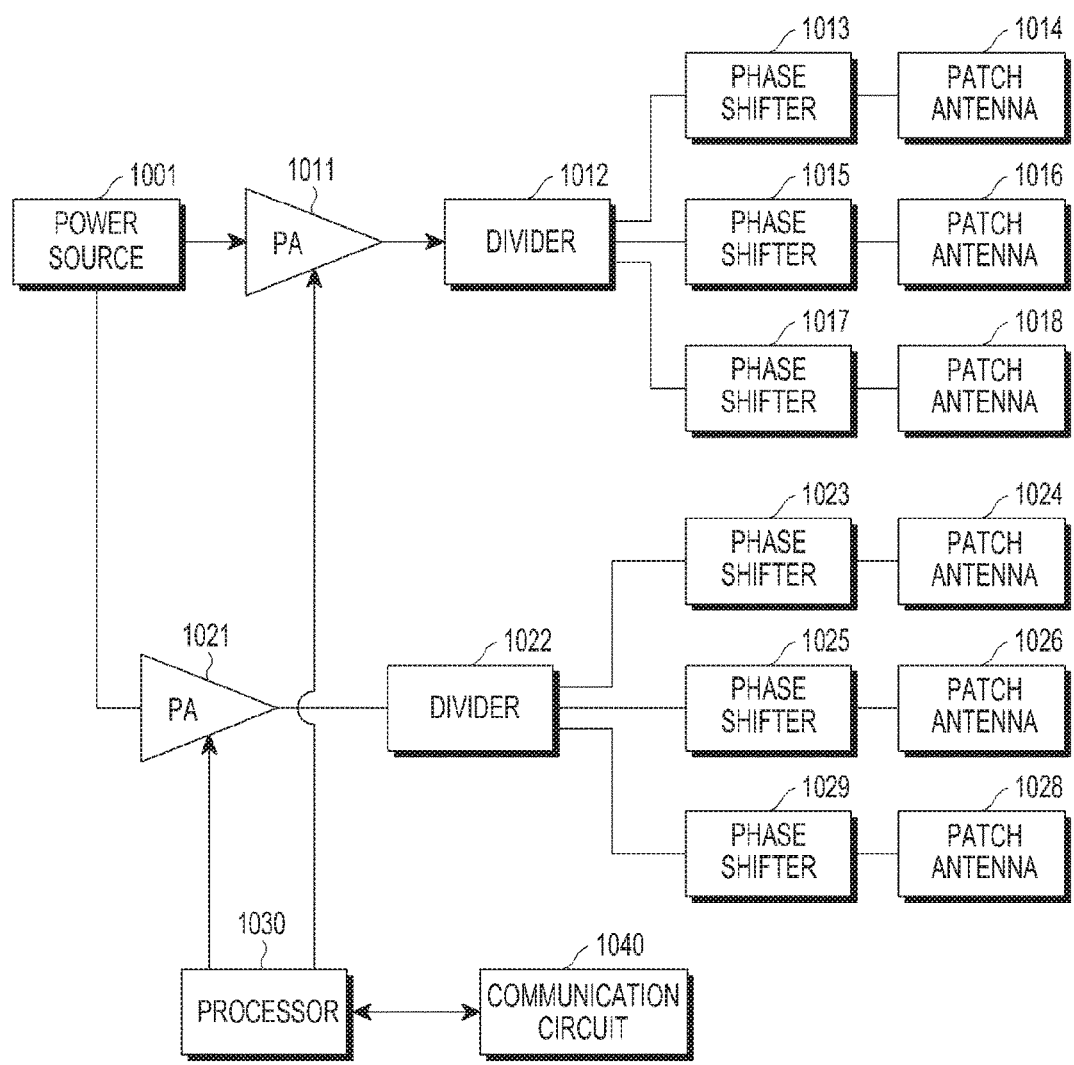

FIGS. 10A and 10B are block diagrams illustrating a wireless power transmitting device, according to an embodiment.

Referring to FIG. 10A, a power source 1001 is connected to a power amplifier (PA) 1002. The power amplifier 1002 amplifies power provided from the power source 1001, and an amplification gain of the power amplifier 1002 is controlled by a processor 1030. For example, the processor 1030 determines a direction of an electronic device using a communication signal of the electronic device delivered from a communication circuit 1040. Further, as described above, in order to determine the distance between the wireless power transmitting device and the electronic device in a determined direction or determine a magnitude of power applied to each patch antenna for which RX power-related information meets a preset condition, the processor 1030 controls the amplification gain of the power amplifier 1002 to form a plurality of RF waves.

Further, the power amplified by the power amplifier 1002 is provided to a divider 1003. The divider 1003 divides power between a plurality of patch antennas 105, 1007, and 1009. Further, phase shifters 1004, 1006, and 1008 are configured between the divider 1003 and the patch antennas 1005, 1007, and 1009. The number of the phase shifters and the number of the patch antennas are merely examples, and a different number of phase shifters or a different number of patch antennas may also be provided. As the phase shifters, hardware components, such as the hittite microwave corporation (HMC) 642 or HMC 1113, may be used. The phase shifters 1004, 1006, and 1008 shift the phase of AC power received, and the processor 1030 controls the degree of shift by the phase shifters 1004, 1006, and 1008. The processor 1030 determines the degree of shift inputted to each of the phase shifters 1004, 1006, and 1008 so that an RF wave is formed in the direction of the electronic device determined using the communication signal.

FIG. 10B is a block diagram illustrating a wireless power transmitting device according to an embodiment. In contrast to the embodiment of FIG. 10A, where all of the patch antennas 1005, 1007, and 1009 are connected to one divider 1003 and one power amplifier 1002, the embodiment of FIG. 10B allows the wireless power transmitting device to include a plurality of power amplifiers 1011 and 1021. Further, the wireless power transmitting device includes dividers 1012 and 1022, respectively connected to the plurality of power amplifiers 1011 and 1021. Phase shifters 1013, 1015, and 1017 and patch antennas 1014, 1016, and 1018 connected to the phase shifters 1013, 1015, and 1017 are connected to the divider 1012. Phase shifters 1023, 1025, and 1027 and patch antennas 1024, 1026, and 1028 connected to the phase shifters 1023, 1025, and 1027 are connected to the divider 1022.

Figure 11A:
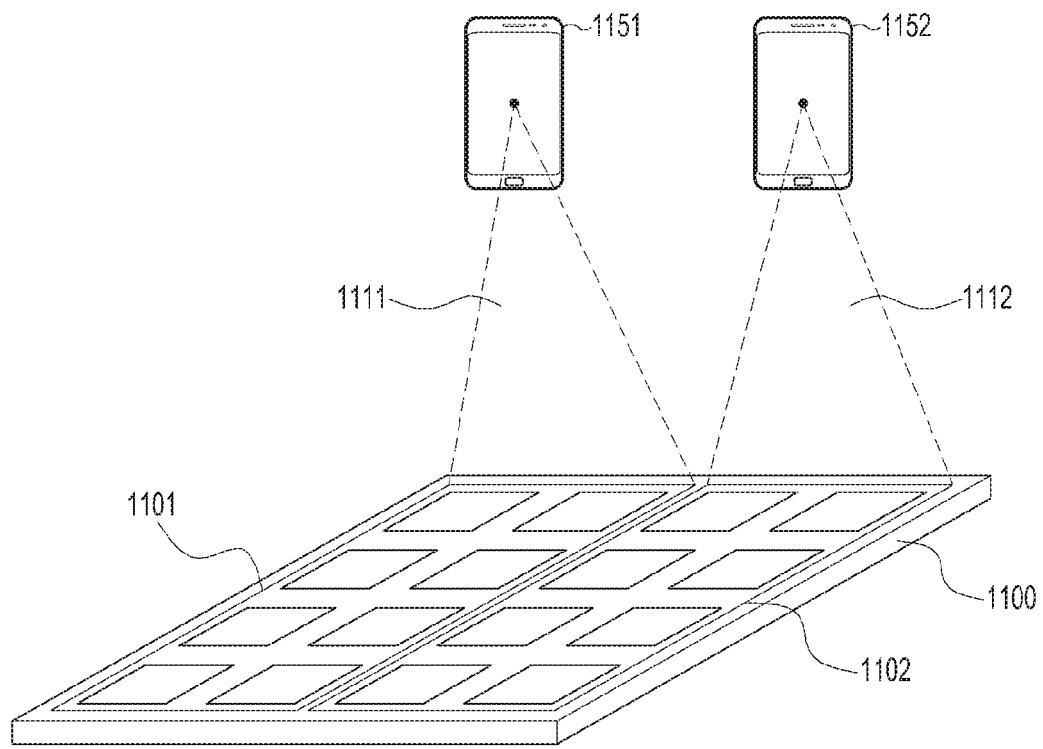
FIGS. 11A and 11B illustrate wireless charging for a plurality of electronic devices, according to an embodiment.
Figure 11B:
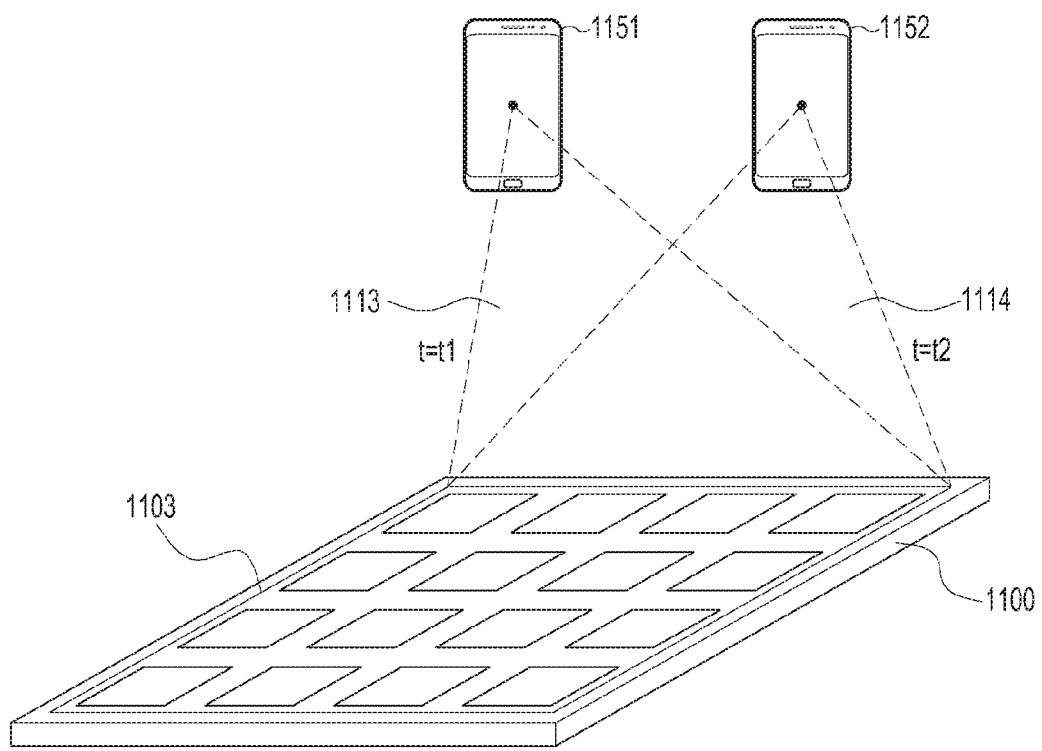

FIGS. 11A and 11B illustrate wireless charging for a plurality of electronic devices, according to an embodiment.

Figure 12A:
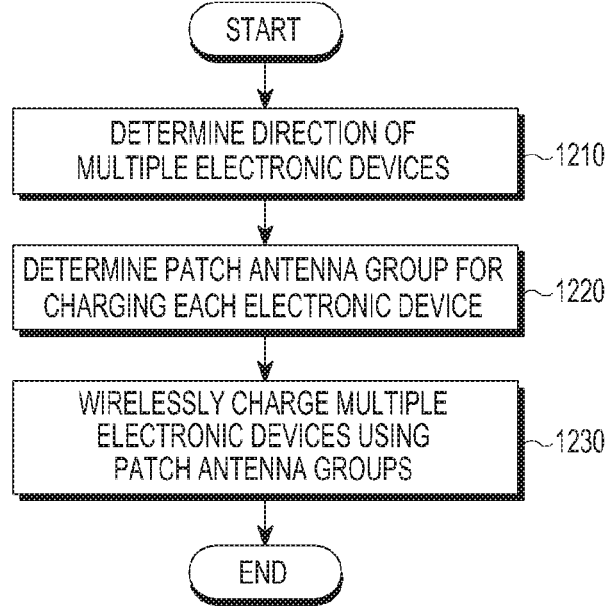
FIGS. 12A and 12B are flowcharts illustrating a method to control a plurality of electronic devices, according to an embodiment.

The embodiment shown in FIG. 11A is described in greater detail with reference to FIG. 12A. Referring to FIG. 12A, in operation 1210, a wireless power transmitting device 1100 determines the direction of electronic devices 1151 and 1152. The wireless power transmitting device 1100 determines the direction of the electronic device 1151, based on a communication signal from the first electronic device 1151, and the direction of the electronic device 1152, based on a communication signal from the second electronic device 1152.

In operation 1220, the wireless power transmitting device 1100 determines patch antenna groups 1101 and 1102 to charge the electronic devices 1151 and 1152, respectively. In operation 1230, the wireless power transmitting device 1100 wirelessly charges the plurality of electronic devices 1151 and 1152 using the patch antenna groups 1101 and 1102. The wireless power transmitting device 1100 determines the distance from the first electronic device 1151 using the patch antenna group 1101 and performs wireless charging based on the determined distance. Further, the wireless power transmitting device 1100 determines the distance from the second electronic device 1152 using the patch antenna group 1102 and performs wireless charging based on the determined distance. Further, according to an embodiment, the wireless power transmitting device 1100 may also perform wireless charging without determining distance, as described above. According to an embodiment, the wireless power transmitting device 1100 select the patch antenna groups 1101 and 1102 depending on the direction of each of the electronic devices 1151 and 1152. For example, for the first electronic device 1151 determined to be positioned relatively at a left side of the wireless power transmitting device 1100, the wireless power transmitting device 1100 selects the patch antenna group 1101, which is positioned relatively at a left side of the wireless power transmitting device 1100. For the second electronic device 1152 determined to be positioned relatively at a right side of the wireless power transmitting device 1100, the wireless power transmitting device 1100 selects the patch antenna group 1102, which is positioned relatively at a right side of the wireless power transmitting device 1100. The patch antenna group 1101 forms an RF wave 1111 to charge the first electronic device 1151, and the patch antenna group 1102 forms an RF wave 1112 to charge the second electronic device 1152.

Further, the wireless power transmitting device 1100 selects a number of patch antennas included in the patch antenna group based on the rated power of each of the electronic devices 1151 and 1152. For example, the wireless power transmitting device 1100 assigns a greater number of patch antennas to the electronic device 1151 or 1152 with relatively high rated power. As set forth above, the electronic devices 1151 and 1152 may be simultaneously charged.

Figure 12B:
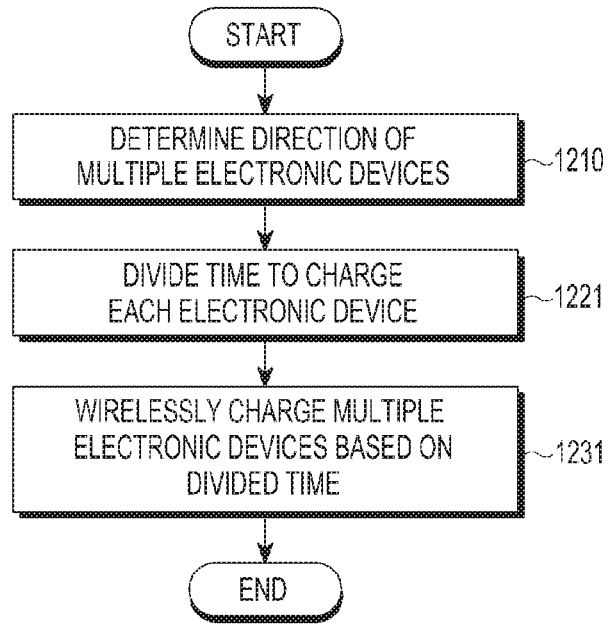

The embodiment shown in FIG. 11B is described in greater detail with reference to FIG. 12B. Referring to FIG. 12B, a wireless power transmitting device 1100 may determine the direction of a plurality of electronic devices 1151 and 1152 in operation 1210. In operation 1221, the wireless power transmitting device 1100 divides time to charge each of the electronic devices 1151 and 1152. In operation 1231, the wireless power transmitting device 1100 wirelessly charges the electronic devices 1151 and 1152 based on the divided charging time. For example, as shown in FIG. 11B, each of the patch antennas 1103 is controlled to form a sub-RF wave to form an RF wave 1113 to charge the first electronic device 1151 for a first time t1, and the overall patch antenna 1103 is used to form an RF wave 1114 to charge the second electronic device 1152 for a second time t2. According to an embodiment, the wireless power transmitting device 1100 selects an electronic device 1151 or 1152 to be charged first depending on priority of the electronic devices 1151 and 1152. In other words, the wireless power transmitting device 1100 completes the charging of the higher-priority electronic device and performs charging of the next-priority electronic device. In an alternative, the wireless power transmitting device 1100 alternately charges the electronic devices 1151 and 1152. In other words, a predetermined time before completing the higher-priority electronic device, the wireless power transmitting device 1100 begins charging the next-priority electronic device 1151 or 1152 for a predetermined time and then resumes the charging of the higher-priority electronic device 1151 or 1152.

Figure 13:
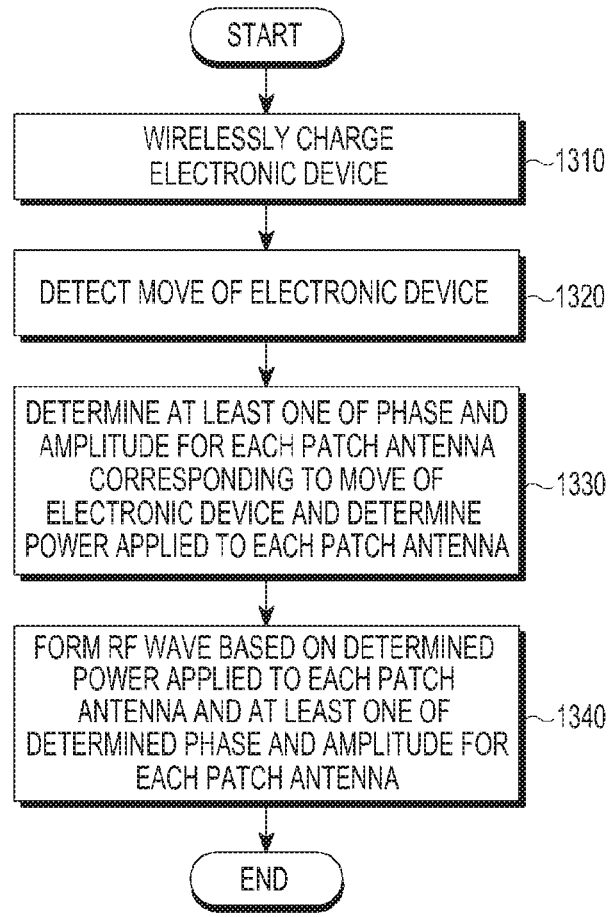
FIGS. 13 to 15 are flowcharts illustrating a method for controlling a wireless power transmitting device according to an embodiment.

FIG. 13 is a flowchart illustrating a method to control a wireless power transmitting device, according to an embodiment.

In operation 1310, a wireless power transmitting device wirelessly charges an electronic device. The wireless power transmitting device performs the wireless charging using the direction of the electronic device and the distance to the electronic device as set forth above.

In operation 1320, the wireless power transmitting device detects a move of the electronic device. In one embodiment, the wireless power transmitting device detects the move of the electronic device based on RX power-related information from the electronic device. As the electronic device moves, the electronic device may not receive sufficient power from the RF wave produced through constructive interference at the point where the electronic device used to be located. As a result, the voltage at the output end of the electronic device also reduces. The wireless power transmitting device may detect the displacement of the electronic device, corresponding to the received power-related information's failure to meet a preset condition.

Alternatively, the wireless power transmitting device detects the displacement of the electronic device based on a communication signal from the electronic device. The wireless power transmitting device continuously receives communication signals from the electronic device and continuously monitors the direction of the electronic device using the communication signals. Thus, the wireless power transmitting device detects a variation in the direction where the electronic device is positioned.

According to an embodiment, the wireless power transmitting device directly receives from the electronic device information about the displacement of the electronic device. The electronic device may include various sensors, such as a gyro sensor, a linear sensor, a geo-magnetic sensor, and a global positioning satellite (GPS) sensor, which is capable of a move. The electronic device detects the displacement of the electronic device using the various sensors and produces displacement information as a communication signal and transmits the communication signal to the wireless power transmitting device. The wireless power transmitting device detects the displacement of the electronic device using the received displacement information.

In operation 1330, the wireless power transmitting device determines at least one of the phase and amplitude for each patch antenna corresponding to the move of the electronic device and determines power applied to each patch antenna. In operation 1340, the wireless power transmitting device forms an RF wave based on the determined power applied to each patch antenna and at least one of the determined phase and amplitude for each patch antenna. In other words, the wireless power transmitting device controls each patch antenna so that sub-RF waves may constructively interfere with each other at the position of the electronic device that has moved. The wireless power transmitting device re-detects a post-displacement or post-move position of the electronic device as per the above-described manner or controls the patch antennas directly using the move information.

Figure 14:
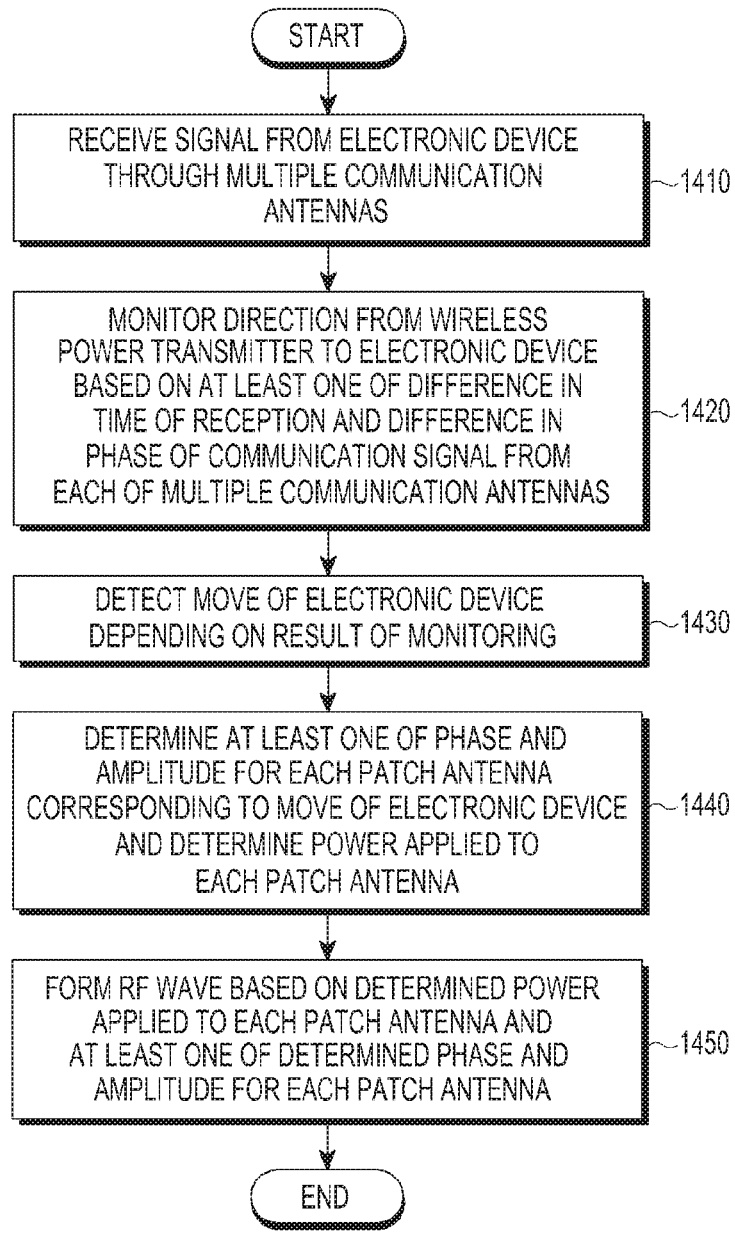

FIG. 14 is a flowchart illustrating a method to control a wireless power transmitting device, according to an embodiment.

In operation 1410, the wireless power transmitting device receives signals from an electronic device through communication antennas. In operation 1420, the wireless power transmitting device monitors the direction from the wireless power transmitting device to the electronic device based on at least one of differences in time of reception and differences in phase between the communication signals received at respective communication antennas. For example, as the electronic device moves, the difference in time of reception or the difference in phase may vary between the communication antennas. In operation 1430, the wireless power transmitting device detects a movement or a displacement of the electronic device based on a result of monitoring.

In operation 1440, the wireless power transmitting device determines at least one of the phase and amplitude for each patch antenna corresponding to the displacement of the electronic device and determines power applied to each patch antenna. The wireless power transmitting device determines at least one of the phase and amplitude for each patch antenna corresponding to the post-move position of the electronic device and determines power applied to each patch antenna. In operation 1450, the wireless power transmitting device forms an RF wave based on the determined power applied to each patch antenna and at least one of the determined phase and amplitude for each patch antenna.

Accordingly, the sub-RF waves constructively interfere with each other at the post-displacement position of the electronic device.

Figure 15:
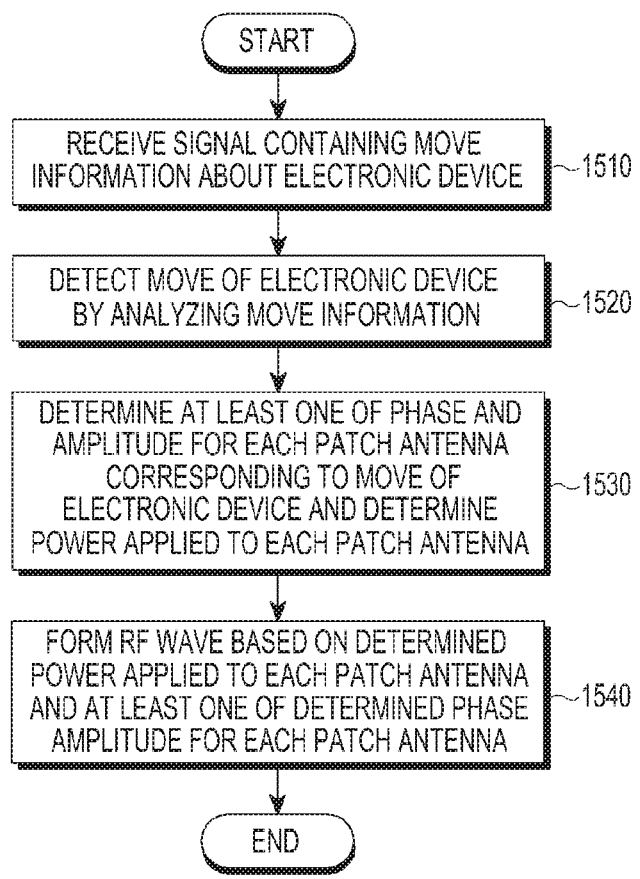

FIG. 15 is a flowchart illustrating a method to control a wireless power transmitting device, according to an embodiment.

In operation 1510, the wireless power transmitting device receives a communication signal containing displacement or movement information about an electronic device. In operation 1520, the wireless power transmitting device detects the displacement or the move of the electronic device by analyzing the move information. As set forth above, the electronic device obtains the displacement or movement information using a sensor configured to detect displacement or movement and transmits a communication signal containing the obtained displacement information.

Meanwhile, operations 1530 and 1540 are substantially similar to operations 1440 and 1450 of FIG. 14, and no further detailed description thereof is presented.

Figure 16:
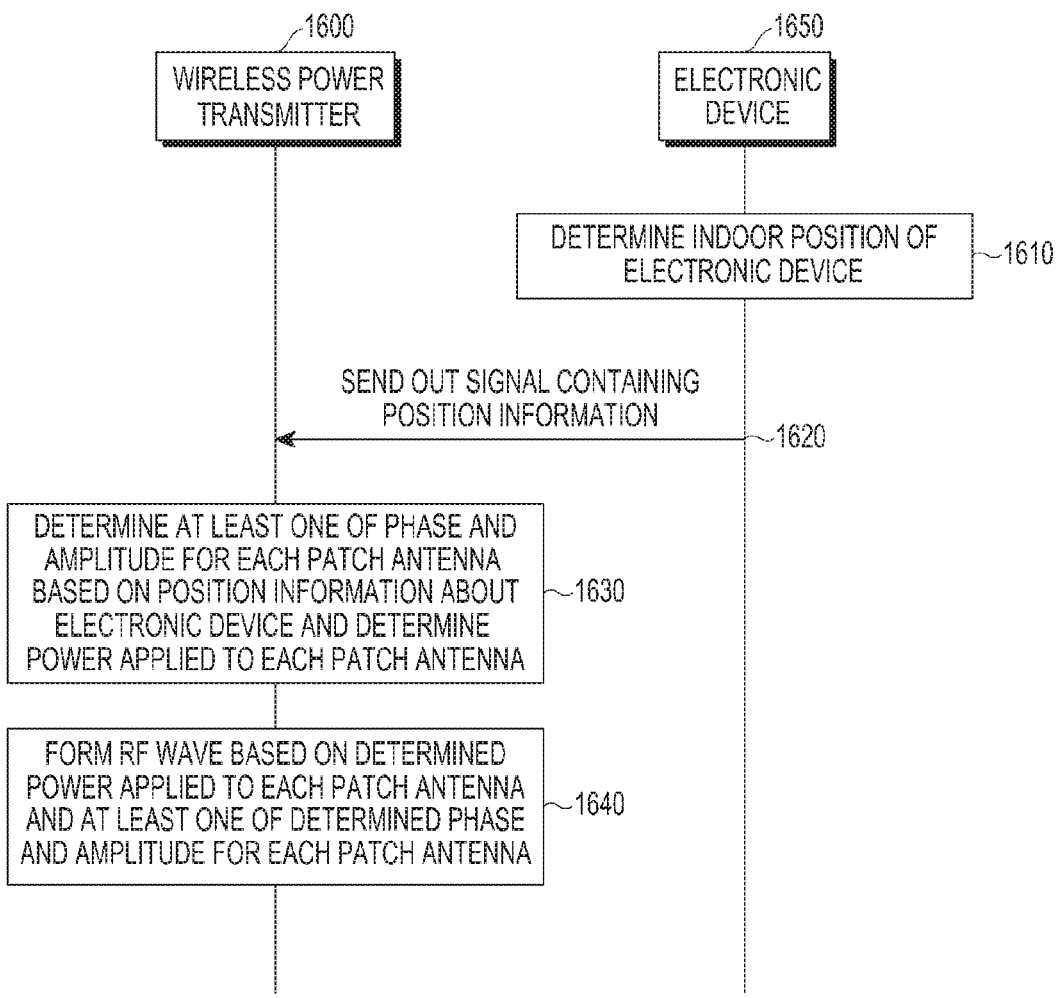
FIG. 16 is a flowchart illustrating operations of a wireless power transmitting device and an electronic device, according to an embodiment.

FIG. 16 is a flowchart illustrating operations of a wireless power transmitting device and an electronic device, according to an embodiment.

In operation 1610, an electronic device determines its position. The electronic device determines its position based on various indoor positioning schemes. For example, the electronic device acquires an indoor geo-magnetic map and compares data sensed by a geo-magnetic sensor with the acquired geo-magnetic map. The electronic device determines its indoor position based on a result of the comparison. In the alternative, the electronic device also determines its indoor position based on a Wi-Fi signal-based indoor positioning scheme. In a further alternative, where the electronic device is positioned outdoors, the electronic device determines its position using a GPS module.

In operation 1620, the electronic device transmits a signal including the position information.

In operation 1630, a wireless power transmitting device determines at least one of the phase and amplitude for each patch antenna based on the position information from the electronic device and determines the magnitude of power applied to each patch antenna. In operation 1640, the wireless power transmitting device forms an RF wave based on the determined power applied to each patch antenna and at least one of the determined phase and amplitude for each patch antenna.

According to an embodiment, there is provided a storage medium storing commands configured to be executed by at least one processor to enable the at least one processor to perform at least one operation that may include determining a direction in which an electronic device is positioned based on a time of reception of a first communication signal from the electronic device by each communication antenna included in the electronic device, controlling patch antennas included in a wireless power transmitting device so that sub-RF waves of a first magnitude constructively interfere with each other in the determined direction, and determining whether to charge the electronic device with the sub-RF waves of the first magnitude based on a second communication signal received from the electronic device.

According to an embodiment, there is provided a storage medium storing commands configured to be executed by at least one processor to enable the at least one processor to perform at least one operation that may include receiving a first communication signal including a position of an electronic device from the electronic device and controlling patch antennas included in a wireless power transmitting device so that sub-RF waves constructively interfere with each other at a position of the electronic device.

The above-described commands may be stored in an external server and may be downloaded and installed on an electronic device, such as a wireless power transmitting device. In other words, according to an embodiment, the external server may store commands that are downloadable by the wireless power transmitting device.

As is apparent from the foregoing description, according to embodiments, there is provided a wireless power transmitting device that determines a direction of power transmission using communication signals from an electronic device and determines the precise location of the electronic device using the determined direction and a method to control the wireless power transmitting device. In accord with many of the advantages of the various embodiments described above, substantial savings in time are produced to determine a location of the electronic device and to transmit harmful radio waves.

The transmitters, devices, elements dividers, shifters, and other structural elements in FIGS. 1, 3, 10A, and 10B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 5, 6, 8, 12A, 12B, and 13 through 16 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitting device, comprising:
a power transmission antenna comprising patch antennas;
communication antennas; and
a processor configured to:
   receive, through the communication antennas, a communication signal from an electronic device,
   detect a direction in which the electronic device is positioned based on the communication signal received through the communication antennas,
   control each of the patch antennas so that sub-radio frequency (RF) waves constructively interfere with each other in the direction of the electronic device, and
control to transmit, through the power transmission antenna, power in the detected direction.

2. The wireless power transmitting device of claim 1, wherein the processor is further configured to determine the direction in which the electronic device is positioned based on at least one of a difference in time of reception of the communication signal at each of the communication antennas and a difference in phase of the communication signal received by each of the communication antennas.

3. The wireless power transmitting device of claim 1, wherein the processor is further configured to determine whether or not to adjust a magnitude of the sub-RF waves to a first magnitude based on whether received power-related information in a second communication signal received after the reception of the communication signal meets a preset condition.

4. The wireless power transmitting device of claim 3,
wherein the processor is further configured to control the patch antennas so that the sub-RF waves of a second magnitude constructively interfere with each other in response to the received power-related information failing to meet the preset condition, and
wherein the processor is further configured to determine whether or not to adjust the magnitude of the sub-RF waves of the second magnitude based on whether RX power-related information in a third communication signal received from the electronic device meets the preset condition.

5. The wireless power transmitting device of claim 4, further comprising:
a power source configured to supply the power; and
a power amplifier configured to amplify the power, wherein
the processor changes the magnitude of the sub-RF waves from the first magnitude to the second magnitude by changing an amplification gain of the power amplifier.

6. The wireless power transmitting device of claim 3, wherein the processor adjusts the power provided to the patch antennas until the received power-related information meets the preset condition, and
wherein the processor is further configured to maintain the magnitude of the power supplied to the patch antennas in response to the received power-related information meeting the preset condition.

7. The wireless power transmitting device of claim 1, wherein the processor is further configured to adjust a phase of the power inputted to each of the patch antennas so that the sub-RF waves of the first magnitude constructively interfere with each other in the detected direction.

8. The wireless power transmitting device of claim 1, wherein the communication signal comprises at least one of identification information of the electronic device and rated power information about the electronic device, and
wherein the processor is further configured to determine whether to charge the electronic device based on at least one of the identification information of the electronic device and the rated power information about the electronic device.

9. The wireless power transmitting device of claim 1, wherein the processor is further configured to:
determine to charge the electronic device;
detect a movement of the electronic device while charging the electronic device with the sub-RF waves of the first magnitude;
change at least one of a magnitude of the sub-RF waves and the determined direction based on the movement of the electronic device; and
control to charge the electronic device.

10. A method performed by a wireless power transmitting device, comprising:
receiving a communication signal from an electronic device;
detecting a direction in which the electronic device is positioned based on the communication signal;
controlling patch antennas so that sub-radio frequency (RF) waves constructively interfere with each other in the direction of the electronic device; and
transmitting power wirelessly in the detected direction.

11. The method of claim 10, wherein detecting the direction of the electronic device based on the communication signal comprises determining the direction of the electronic device based on at least one of a difference in time of reception of the communication signal and a difference in phase of the communication signal received by each of communication antennas in the wireless power transmitting device.

12. The method of claim 10, further comprising:
determining whether to charge the electronic device with the sub-RF waves of first magnitude depending on whether received (RX) power-related information in a second communication signal received after the reception of the communication signal meets a preset condition.

13. The method of claim 12, further comprising:
controlling the patch antennas so that the sub-RF waves of a second magnitude constructively interfere with each other in response to the received power-related information being determined to fail to meet the preset condition; and
determining whether to charge the electronic device with the sub-RF waves of the second magnitude depending on whether RX power-related information in a third communication signal received from the electronic device meets the preset condition.

14. The method of claim 13, wherein controlling the patch antennas so that the sub-radio frequency (RF) waves of the second magnitude constructively interfere with each other in the determined direction comprises changing a magnitude of the sub-RF waves from the first magnitude to the second magnitude by varying an amplification gain of the power amplifier.

15. The method of claim 12, further comprising:
adjusting the power provided to the patch antennas until the received power-related information meets the preset condition; and
charging the electronic device with the power provided to the patch antennas in response to the received power-related information meeting the preset condition.

16. The method of claim 10, further comprising:
determining to charge the electronic device;
detecting a movement of the electronic device while charging the electronic device with the sub-RF waves of the first magnitude; and
varying at least one of a magnitude of the sub-RF waves and the determined direction corresponding to the movement of the electronic device, and charges the electronic device.

17. The method of claim 10, further comprising:
receiving another communication signal from another electronic device; and
determining a direction in which the other electronic device is positioned based on at least one of a difference in time of reception and a difference in phase of the other communication signal by each of communication antennas in the wireless power transmitting device from the other electronic device.

18. The method of claim 17, further comprising:
enabling the patch antennas to charge the electronic device during a first period and the patch antennas to charge the other electronic device during a second period.

* * * * *